(12) United States Patent
Dai et al.

(10) Patent No.: US 8,934,433 B2
(45) Date of Patent: Jan. 13, 2015

(54) METHOD AND DEVICE FOR TRANSMITTING CONTROL FORMAT INDICATOR VALUE

(75) Inventors: Bo Dai, Shenzhen (CN); Ping Zeng, Shenzhen (CN); Xin Wu, Shenzhen (CN); Zhisong Zuo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 142 days.

(21) Appl. No.: 13/636,154

(22) PCT Filed: Dec. 17, 2010

(86) PCT No.: PCT/CN2010/079914
§ 371 (c)(1),
(2), (4) Date: Sep. 20, 2012

(87) PCT Pub. No.: WO2011/153806
PCT Pub. Date: Dec. 15, 2011

(65) Prior Publication Data
US 2013/0010741 A1 Jan. 10, 2013

(30) Foreign Application Priority Data
Jun. 12, 2010 (CN) .......................... 2010 1 0203746

(51) Int. Cl.
*H04W 4/00* (2009.01)
*H04W 80/02* (2009.01)
*H04L 5/00* (2006.01)
(52) U.S. Cl.
CPC ............... *H04W 80/02* (2013.01); *H04L 5/001* (2013.01); *H04L 5/0094* (2013.01)
USPC ........................................................ 370/329
(58) Field of Classification Search
None
See application file for complete search history.

(56) References Cited

U.S. PATENT DOCUMENTS

2011/0110315 A1* 5/2011 Chen et al. .................... 370/329
2011/0170496 A1* 7/2011 Fong et al. .................... 370/329
(Continued)

FOREIGN PATENT DOCUMENTS

CN 101651996 2/2010
CN 101860396 10/2010

OTHER PUBLICATIONS

International Search Report for PCT/CN2010/079914, English translation attached to original, Both completed by the Chinese Patent Office on Mar. 10, 2011, All together 6 Pages.
(Continued)

*Primary Examiner* — Dang Ton
*Assistant Examiner* — Ronald H Davis
(74) *Attorney, Agent, or Firm* — Brooks Kushman P.C.

(57) ABSTRACT

A method for transmitting control format indicator values includes RRC configuring CFI values and transmitting signalings related thereto with one of multiple modes. The modes include configuring one RRC signaling for each component carrier which can be cross-carrier scheduled for user equipment, to indicate a CFI value of each subframe of said component carrier; configuring one RRC signaling respectively for each of subframe types designated by all component carriers which can be cross-carrier scheduled for user equipment, to indicate a CFI value of each designated subframe type; configuring one RRC signaling respectively for each designated subframe type of each component carrier which can be cross-carrier scheduled for user equipment, to indicate a CFI value of each subframe type designated; and configuring one RRC signaling for each user equipment for which cross-carrier scheduling can be performed, to indicate the CFI values of all component carriers which can be cross-carrier scheduled.

16 Claims, 1 Drawing Sheet

(56) References Cited

U.S. PATENT DOCUMENTS

2011/0268032 A1* 11/2011 Kim et al. .................. 370/328
2013/0153298 A1* 6/2013 Pietraski et al. ............ 175/45

OTHER PUBLICATIONS

3GPP TSG-RAN WG1 Meeting 60bis, R1-102258, Beijing, P. R. China, Apr. 12-16, 2010, "Cross-carrier CFI signalling", All together 5 Pages.

3GPP TSG-RAN WG1 61 R1-102833, May 10-14, 2010, Montreal, Canada, "On the PCFICH detection in cross-carrier scheduling", All together 3 Pages.

3GPP TSG RAN WG1 Meeting 61 R1-103243, Montreal, Canada, May 10-14, 2010, "PCFICH for Cross-Carrier Assignment", All together 4 Pages.

* cited by examiner

METHOD AND DEVICE FOR TRANSMITTING CONTROL FORMAT INDICATOR VALUE

CROSS-REFERENCE TO RELATED APPLICATION

This application is the U.S. national phase of PCT Appln. No. PCT/CN2010/079914 filed Dec. 17, 2010 which claims priority from Chinese Application No. 201010203746.4 filed Jun. 12, 2010, the disclosures of which are incorporated in their entirety by reference herein.

TECHNICAL FIELD

The present invention relates to the field of communications, and in particular, to a method and apparatus for transmitting control format indicator values.

BACKGROUND OF THE RELATED ART

Radio frames in the Long Term Evolution (LTE) system comprises frame structures of a Frequency Division Duplex (FDD) mode and a Time Division Duplex (TDD) mode.

The frame structure of the FDD mode is shown in FIG. 1, in which, one radio frame with 10 ms is comprised of 20 slots each with a length being 0.5 ms and numbered with 0-19, and slots $2i$ and $2i+1$ compose a subframe i with a length being 1 ms.

The frame structure of the TDD mode is shown in FIG. 2, in which, one radio frame with 10 ms is comprised of two half frames each with a length being 5 ms, one half frame comprises 5 subframes each with a length being 1 ms, and a subframe i defines two slots $2i$ and $2i+1$ each with a length being 0.5 ms.

In the above two types of frame structures, for a Normal Cyclic Prefix (Normal CP), one slot comprises 7 Orthogonal Frequency Division Multiplexing (OFDM) symbols each with a length being 66.7 μs, wherein, a length of the CP of the first OFDM symbol is 5.21 μs, and the length of each of 6 remaining OFDM symbols is 4.69 μs; and for an Extended Cyclic Prefix (Extended CP), one slot comprises 6 OFDM symbols, and the length of the CP of each OFDM symbol is 16.67 μs.

A Multi-Broadcast Single Frequency Network (MBSFN for short) subframe can be used to transmit a Physical Downlink Shared Channel (PDSCH for short) and a Physical Multicast Channel (PMCH for short).

When the LTE system uses a Normal CP, one slot comprises 7 lengths of uplink/downlink OFDM symbols, and numbers of the OFDM symbols are 0, 1, 2, 3, 4, 5, 6 in turn in an order of transmitting time. When the LTE system uses an Extended CP, one slot comprises 6 lengths of uplink/downlink OFDM symbols, and numbers of the OFDM symbols are 0, 1, 2, 3, 4, 5 in turn in an order of transmitting time.

In the LTE system, the following three downlink physical control channels are further defined: a Physical Control Format Indicator Channel (PCFICH), a Physical Hybrid Automatic Retransmission Request Indicator Channel (PHICH), and a Physical Downlink Control Channel (PDCCH). Wherein, (1) Information carried by the PCFICH is used to indicate the number of OFDM symbols in the PDCCH transmitted in one subframe, and is transmitted on the first OFDM symbol of the subframe, and a frequency position where it is located is determined by the downlink bandwidth of the system and a cell Identity (ID).

In the LTE R9 version, the Control Format Indicator (CFI) value can be configured with values 0, 1, 2, 3, 4 according to different subframe types.

(2) The PHICH is used to carry Acknowledge/Negative Acknowledge (ACK/NACK) feedback information of uplink transmission data. The number of the PHICHs and a time frequency position can be determined by system message in the Physical Broadcast Channel (PBCH) of the downlink carrier where the PHICH is located and the cell ID.

(3) The PDCCH is used to carry Downlink Control Information (DCI), which comprises: uplink, downlink scheduling information and uplink power control information. The formats of the PDCCH DCI (DCI formats) are divided into the following several types: DCI format 0, DCI format 1, DCI format 1A, DCI format 1B, DCI format 1C, DCI format 1D, DCI format 2, DCI format 2A, DCI format 3 and DCI format 3A etc., wherein, the DCI format 0 is used to indicate the scheduling of the Physical Uplink Shared Channel (PUSCH);

the DCI format 1, DCI format 1A, DCI format 1B, DCI format 1C and DCI format 1D are used for different modes of code scheduling of a Physical Downlink Shared Channel (PDSCH);

the DCI format 2 and the DCI format 2A are used for different modes of spatial division multiplexing; and the DCI format 3 and DCI format 3A are used for different modes of power control instructions of the Physical Uplink Control Channel (PUCCH) and PUSCH.

In the protocol of the version number of the LTE corresponding to Release 8 (R8), 6 types of bandwidths are defined as: 1.4 MHz, 3 MHz, 5 MHz, 10 MHz, 15 MHz and 20 MHz. The LTE-Advanced (Further Advancements for E-UTRA) is an evolved version of the LTE Release-8. Besides meeting or exceeding all related requirements of 3GPP TR 25.913: "Requirements for Evolved UTRA (E-UTRA) and Evolved UTRAN (E-UTRAN)", the requirements of the IMT-Advanced proposed by International Telecom Union-Radio (ITU-R) are also required to be achieved or exceeded.

Wherein, the requirements of backward compatibility with the LTE Release-8 refers to that a terminal of the LTE Release-8 can work in the network of the LTE-Advanced; and the terminal of the LTE-Advanced can work in the network of the LTE Release-8.

In addition, the LTE-Advanced should be able to work in frequency spectrum configurations with different sizes, comprising: a frequency spectrum configuration wider than that of the LTE Release-8 (for example, continuous frequency spectrum resources of 100 MHz), to achieve higher performance and the target peak rate. In consideration of compatibility with the LTE Release-8, for bandwidth greater than 20 MHz, a mode of carrier aggregation is used, i.e., two or more component carriers are aggregated to support downlink transmission bandwidth greater than 20 MHz;

the terminal can receive one or more component carriers at the same time according to the capability thereof.

According to the capability of carrier aggregation for the UE and interference circumstances as well as system load conditions, a UE-specific Downlink Component Carrier set (DL CC Set for short) can be configured through a high-layer signaling. When the system transmits downlink data to the UE, the PDSCH can be transmitted in any component carrier in the given DL CC Set.

A terminal of the LTE-A with a receiving capability of more than 20 MHz bandwidth can receive transmission on multiple component carriers at the same time. The terminal of the LTE Rel-8 can only receive transmission on only one component carrier, for example, the structure of the component carrier conforms to the Rel-8 specification.

At present, a way for transmitting the downlink control signaling, i.e., Physical Downlink Control Channel (PDCCH) in the LTE-Advanced standard comprises:

1) The PDCCH on one component carrier indicates the PDSCH resource of the same component carrier and the PUSCH resource of the uplink component carrier to which said component carrier is uniquely connected;

there is no carrier indicator field in the DCI format, for example, the structure of the PDCCH in the Rel-8 version (with the same encoding, the same CCE based resource mapping) and DCI formats.

2) The PDCCH on one component carrier can use the carrier indicator field to indicate the PDSCH or PUSCH resource of one of multiple component carriers.

A carrier indicator field of 3 bits is extended in the DCI formats of the Rel-8;

the structure of the Rel-8 PDCCH (with the same encoding, the same CCE-based resource mapping) is reused;

3) All the numbers of limiting blind detections under two modes are advisable.

4) Whether the Carrier Indicator (CI) field exists is semistatically set.

When the PDCCH on one component carrier uses the carrier indicator field to indicate the PDSCH resource of another component carrier, if the UE detects falsely the PCFICH channel of the component carrier where the PDSCH is located, the UE judges the OFDM symbol starting from the PDSCH falsely and samples the data of the transmission carrier block carried by the PDSCH falsely, and the UE stores false data in the HARQ buffer and feeds back with the NACK, which will produce an error in the HARQ incorporation thereafter and have certain adverse effects on the performance of the system.

The component carrier set which can be cross-carrier scheduled for the UE is configured by the RRC signaling.

For the above cross-carrier scheduling case of the PDCCH on one component carrier indicating the PDSCH resource on another component carrier, if the CFI value of the component carrier where the PDSCH is located in such a case is determined according to the decoding of the PCFICH, the false detection of the PCFICH channel has adverse effects on the performance of the system.

SUMMARY OF THE INVENTION

The present invention provides a method for transmitting CFI values, to solve the problem that the CFI configuration can not be managed in the component carriers in the related art.

In order to solve the above technical problem, the present invention provides the following technical scheme:

a method for transmitting Control Format Indicator (CFI) values, wherein, a Radio Resource Control (RRC) configures CFI values for component carriers which can be cross-carrier scheduled for user equipment and transmits related signalings of the CFI values, wherein, the mode of the RRC configuring the CFI values for the component carriers which can be cross-carrier scheduled for the user equipment is one of the following modes:

mode one: configuring one RRC signaling for each component carrier which can be cross-carrier scheduled for the user equipment, to indicate a CFI value of each subframe of the component carrier which can be cross-carrier scheduled;

mode two: configuring one RRC signaling respectively for each of subframe types designated by all component carriers which can be cross-carrier scheduled for the user equipment according to a preset first subframe type classifying strategy, to indicate a CFI value of each of the subframe types designated by the component carriers which can be cross-carrier scheduled;

mode three: configuring one RRC signaling respectively for each of subframe types designated by each component carrier which can be cross-carrier scheduled for the user equipment according to the preset first subframe type classifying strategy, to indicate a CFI value of each of the subframe types designated by the component carrier which can be cross-carrier scheduled; and mode four: configuring one RRC signaling for each user equipment for which cross-carrier scheduling can be performed, to indicate the CFI values of all component carriers which can be cross-carrier scheduled for the user, wherein, the component carriers which can be cross-carrier scheduled do not include the present carrier;

alternatively, in mode one, the number N of the RRC signalings of each user equipment is equal to the number of the component carriers which can be cross-carrier scheduled for the user equipment, and the N RRC signalings are ranked in an order of sizes of carrier indicators (CI) or frequencies of the component carriers which can be cross-carrier scheduled for the user equipment.

Alternatively, in mode two, the number M of the RRC signalings of each user equipment is equal to the number of the subframe types designated by all component carriers which can be cross-carrier scheduled for the user equipment, and the M RRC signalings are ranked in an order of the predefined subframe types.

Alternatively, in mode three, the number P of the RRC signalings of each user equipment is determined by the number Q of the subframe types designated by each component carrier which can be cross-carrier scheduled for the user equipment and a total number R of the component carriers which can be cross-carrier scheduled for the user equipment, i.e., $P=Q \times R$; and a rule for ranking the P RRC signalings is as follows: Q RRC signalings in each component carrier are ranked in an order of the predefined subframe types, and Q RRC signalings corresponding to each of the R component carriers are ranked in cascade in an order of sizes of carrier indicators (CI) or frequencies of the component carriers which can be cross-carrier scheduled for the user equipment.

Alternatively, the overhead of said one RRC signaling is 1 bit or 2 bits.

Alternatively, the mode one or mode four further comprises:

according to a preset second subframe type classifying strategy, the RRC signaling and the subframe type of the component carrier corresponding to the RRC signaling jointly determine the CFI value of the component carrier, wherein, the subframe types in the second subframe type classifying strategy totally consist of the following six classes: the first class of subframes comprise the subframe 1 and the subframe 6 of the frame structure type 2; the second class of subframes comprise Multicast Broadcast Single Frequency Network (MBSFN) subframes supporting PDSCH transmission and configured with 1 or 2 cell-specific antenna ports; the third class of subframes comprise MBSFN subframes supporting PDSCH transmission and configured with 4 cell-specific antenna ports; a fourth class of subframes comprise subframes not supporting PDSCH transmission; a fifth class of subframes comprise non-MBSFN frames configured with positioning reference signals including the subframe 6 of the frame structure type 2; and a sixth class of subframes comprise subframes of all other cases.

Alternatively, in the mode one or mode four, the overhead of the one RRC signaling is 1 bit, when a bandwidth of the component carriers which can be cross-carrier scheduled is more than 10 physical resource blocks, one of two states of the RRC signaling of 1 bit corresponds to one of two values in the following value combinations one by one according to the subframe types of the component carriers corresponding to the RRC signaling:

CFI values of the first class of subframes are (1, 2);
CFI values of the second class of subframes are (1, 2);
CFI values of the third class of subframes are (2, 2);
CFI values of the fourth class of subframes are (0, 0);
CFI values of the fifth class of subframes are (1, 2), (2, 3) or (1, 3);
CFI values of the sixth class of subframes are (1, 2), (2, 3) or (1, 3);

wherein, a form of "(A, B)" represents one kind of value combination of the CFI, and A≤B.

When the bandwidth of the component carriers which can be cross-carrier scheduled is less than or equal to 10 physical resource blocks, one of two states of the RRC signaling of 1 bit corresponds to one of two values in the following value combinations one by one according to the subframe types of the component carriers corresponding to the RRC signaling:

the CFI values of the first class of subframes are (2, 2);
the CFI values of the second class of subframes are (2, 2);
the CFI values of the third class of subframes are (2, 2);
the CFI values of the fourth class of subframes are (0, 0);
the CFI values of the fifth class of subframes are (2, 3);
the CFI values of the sixth class of subframes are (2, 3), (2, 4) or (3, 4);

wherein, a form of "(A, B)" represents one kind of value combination of the CFI, and A≤B.

Alternatively, in the mode one or mode four, the overhead of the one RRC signaling is 2 bits, when the bandwidth of the component carriers which can be cross-carrier scheduled is more than 10 physical resource blocks, one of four states of the RRC signaling of 2 bits corresponds to one of three values in the following value combinations one by one according to the subframe types of the component carriers corresponding to the RRC signaling:

CFI values of the first class of subframes are (1, 2, 2) or (1, 1, 2);
CFI values of the second class of subframes are (1, 2, 2) or (1, 1, 2);
CFI values of the third class of subframes are (2, 2, 2);
CFI values of the fourth class of subframes are (0, 0, 0);
CFI values of the fifth class of subframes are (1, 2, 3);
CFI values of the sixth class of subframes are (1, 2, 3);

wherein, a form of "(A, B, C)" represents one kind of value combination of the CFI, and A≤B≤C.

When the bandwidth of the component carriers which can be cross-carrier scheduled is less than or equal to 10 physical resource blocks, one of four states of the RRC signaling of 2 bits corresponds to one of three values in the following value combinations one by one according to the subframe types of the component carriers corresponding to the RRC signaling:

the CFI values of the first class of subframes are (2, 2, 2);
the CFI values of the second class of subframes are (2, 2, 2);
the CFI values of the third class of subframes are (2, 2, 2);
the CFI values of the fourth class of subframes are (0, 0, 0);
the CFI values of the fifth class of subframes are (2, 2, 3) or (2, 3, 3);
the CFI values of the sixth class of subframes are (2, 3, 4);

wherein, a form of "(A, B, C)" represents one kind of value combination of the CFI, and A≤B≤C.

Alternatively, in the mode two or mode three, the first subframe type classifying strategy is one of the following classifying strategies:

the first type classifying strategy: dividing the designated subframe types into two types, wherein, the first type of subframes comprise the subframe 1 and the subframe 6 of the frame structure type 2 and Multicast Broadcast Single Frequency Network (MBSFN) subframes supporting PDSCH transmission and configured with 1 or 2 cell-specific antenna ports, the second type of subframes comprise non-MBSFN frames configured with positioning reference signals excluding the subframe 6 of the frame structure type 2 and subframes of all other cases;

the second classifying strategy:

dividing the designated subframe types into three types according to the following classifying modes, wherein, classifying mode one: the first type of subframes comprise the subframe 1 and the subframe 6 of the frame structure type 2, the second type of subframes comprise MBSFN subframes supporting PDSCH transmission and configured with 1 or 2 cell-specific antenna ports, and the third type of subframes comprise non-MBSFN frames configured with positioning reference signals excluding the subframe 6 of the frame structure type 2 and subframes of all other cases;

classifying mode two: the first type of subframes comprise the subframe 1 and the subframe 6 of the frame structure type 2 and MBSFN subframes supporting PDSCH transmission and configured with 1 or 2 cell-specific antenna ports, the second type of subframes comprise non-MBSFN frames configured with positioning reference signals excluding the subframe 6 of the frame structure type 2, and the third type of subframes comprise subframes of all other cases; and the third type classifying strategy: dividing the designated subframe types into four types, wherein, the first type of subframes comprise the subframe 1 and the subframe 6 of the frame structure type 2, the second type of subframes comprise MBSFN subframes supporting PDSCH transmission and configured with 1 or 2 cell-specific antenna ports, and the third type of subframes comprise non-MBSFN frames configured with positioning reference signals excluding the subframe 6 of the frame structure type 2, and the fourth type of subframes comprise subframes of all other cases.

Wherein, a CFI value of an MBSFN subframe supporting PDSCH transmission and configured with four cell-specific antenna ports is fixedly 2; and a CFI value of a subframe not supporting PDSCH transmission is fixedly 0;

the subframes of all other cases do not comprise: the subframe 1 and subframe 6 of the frame structure type 2, the MBSFN subframes supporting PDSCH transmission and configured with 1 or 2 cell-specific antenna ports, the non-MBSFN frames configured with positioning reference signals excluding the subframe 6 of the frame structure type 2, the MBSFN subframes supporting PDSCH transmission and configured with 4 cell-specific antenna ports, and the subframes not supporting PDSCH transmission.

Alternatively, when the designated subframe types are divided into two types, the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling is not more than 10 physical resource blocks, the CFI value of the first type of subframes of the component carriers is fixedly 2.

Alternatively, when the designated subframe types are divided into two types, the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), (1, 3) or (2, 3), and when the bandwidth of the component carriers corresponding to the RRC signaling of the second type of subframes is not more than 10 physical resource blocks, one of two states of the 1 bit corresponds to one of two values of the CFI one by one, and the two values are (2, 3), (2, 4) or (3, 4); or the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the three values are (1, 2, 3), and when the bandwidth of the component carriers corresponding to the RRC signaling of the second type of subframes is not more than 10 physical resource blocks, three of four states of the 2 bits determinately correspond to three or two values of the CFI, and the three values are (2, 3, 4), and the two values are (2, 3), (2, 4) or (3, 4).

Alternatively, when the designated subframe types are divided into three types according to the classifying mode one:

the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), and when the bandwidth of the component carriers corresponding to the RRC signaling of the second type of subframes is not more than 10 physical resource blocks, the CFI value of the second type of subframes of the component carriers is fixedly 2.

Alternatively, when the designated subframe types are divided into three types according to the classifying mode one:

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3), (2, 4) or (3, 4); or the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values are (2, 3, 4), or three of four states of the 2 bits determinately correspond to two values of the CFI, and the two values are (2, 3), (2, 4) or (3, 4).

Alternatively, when the designated subframe types are divided into three types according to the classifying mode two:

the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2.

Alternatively, when the designated subframe types are divided into three types according to the classifying mode two:

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the second type of subframes is not more than 10 physical resource blocks, one of two states of the 1 bit corresponds to one of two values of the CFI one by one, and the two values are (2, 3);

or, the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the second type of subframes is not more than 10 physical resource blocks, three of four states of the 2 bits determinately corresponds to one of the two values of the CFI, and the two values are (2, 3).

Alternatively, when the designated subframe types are divided into three types according to the classifying mode two:

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3), (2, 4) or (3, 4);

or, the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values of the CFI are (2, 3, 4).

Alternatively, when the designated subframe types are divided into four types:

the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), and when the bandwidth of the component carriers corresponding to the RRC signaling of the second type of subframes is not more than 10 physical resource blocks, the CFI value of the second type of subframes of the component carriers is fixedly 2.

Alternatively, when the designated subframe types are divided into four types:

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3);

or the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the third type of subframes is not more than 10 physical resource blocks, three of four states of the 2 bits determinately corresponds to one of two values of the CFI, and the two values of the CFI are (2, 3).

Alternatively, when the designated subframe types are divided into four types:

the overhead of the RRC signaling of the fourth type of subframes is 1 bit, and when the bandwidth of the component carriers corresponding to the RRC signaling of the fourth type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the fourth type of subframes is not more than 10 physical resource blocks, one of two states of the 1 bit corresponds to one of two values of the CFI one by one, and the two values are (2, 3), (2, 4) or (3, 4);

or, the overhead of the RRC signaling of the fourth type of subframes is 2 bits, and when the bandwidth of the component carriers corresponding to the RRC signaling of the fourth type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the fourth type of subframes is not more than 10 physical resource blocks, one of four states of the 2 bits corresponds to one of three values of the CFI one by one, and the three values are (2, 3, 4).

Alternatively, the CFI value configured by the RRC signaling indicates an initial OFDM symbol position of the PDSCH which is cross-carrier scheduled.

The present invention further provides an apparatus for transmitting Control Format Indicator (CFI) values, which is applied to a Radio Resource Control (RRC), comprising a CFI value configuration module and a signaling transmitting module, wherein, the CFI value configuration module is set to configure the CFI values for component carriers which can be cross-carrier scheduled for user equipment by one of the following modes:

mode one: configuring one RRC signaling for each component carrier which can be cross-carrier scheduled for the user equipment, to indicate a CFI value of each subframe of the component carrier which can be cross-carrier scheduled;

mode two: configuring one RRC signaling respectively for each of subframe types designated by all component carriers which can be cross-carrier scheduled for the user equipment according to a preset first subframe type classifying strategy, to indicate a CFI value of each of the subframe types designated by the component carriers which can be cross-carrier scheduled;

mode three: configuring one RRC signaling respectively for each of subframe types designated by each component carrier which can be cross-carrier scheduled for the user equipment according to the preset first subframe type classifying strategy, to indicate a CFI value of each of the subframe types designated by the component carrier which can be cross-carrier scheduled; and mode four: configuring one RRC signaling for each user equipment for which cross-carrier scheduling can be performed, to indicate the CFI values of all component carriers which can be cross-carrier scheduled for the user, configuring CFI values for the component carriers which can be cross-carrier scheduled for the user equipment;

wherein, the component carriers which can be cross-carrier scheduled do not include the present carrier; and the signaling transmitting module is configured to transmit the related signaling of the CFI value configured by the CFI value configuration module to a signaling receiving party.

The technical scheme provided by the present invention configures independent or uniform CFI values for all component carries which can be cross-carrier scheduled for the user equipment, which explicitly defines the management scheme of the CFI values and facilitates the actual management and application.

PREFERRED EMBODIMENTS OF THE PRESENT INVENTION

Figure 1:
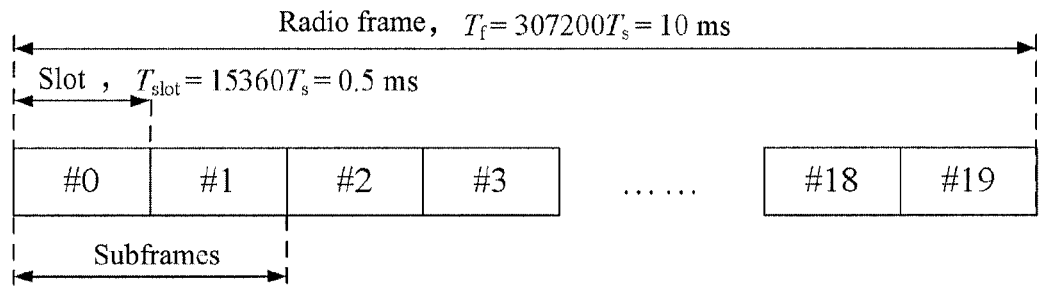
FIG. 1 is a diagram of a frame structure of a FDD mode in the related art.
Figure 2:
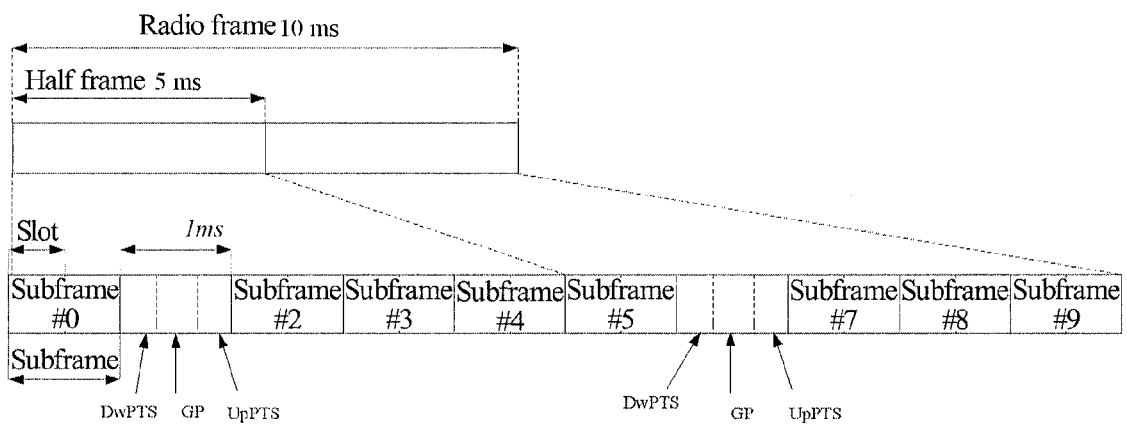
FIG. 2 is a diagram of a frame structure of a TDD mode in the related art.

At present, during the cross-carrier scheduling, the CFI value uses Radio Resource Control (RRC for short) to semi-statically configure one value as a baseline processing method. The specific configuration modes need to be defined, for example, whether all the CFI value configurations are supported, how to define the overhead of the signaling, whether different CFI values are configured for various subframe types. The present invention describes how the RRC specifically configures CFI values during the cross-carrier scheduling.

In order to make the purpose, technical scheme and advantages of the present invention more clear, the present invention will be further described in detail in conjunction with accompanying drawings and specific embodiments hereinafter.

Concerning that there is no complete specific scheme for semi-statically configuring the UE-specific CFI values by the RRC at present in the scene of cross-carrier scheduling, the present invention provides a relatively complete scheme.

Radio Resource Control (RRC) configures CFI values for component carriers which can be cross-carrier scheduled for user equipment using one of the following modes, and transmitting related signalings of the CFI values, wherein, the modes comprise:

mode one: configuring one RRC signaling for each component carrier which can be cross-carrier scheduled for the user equipment, to indicate a CFI value of each subframe of the component carrier which can be cross-carrier scheduled;

mode two: configuring one RRC signaling respectively for each of subframe types designated by all component carriers which can be cross-carrier scheduled for the user equipment according to a preset first subframe type classifying strategy, to indicate a CFI value of each designated subframe type;

mode three: configuring one RRC signaling respectively for each designated subframe type of each component carrier which can be cross-carrier scheduled for the user equipment according to the preset first subframe type classifying strategy, to indicate a CFI value of each subframe type designated by the component carrier which can be cross-carrier scheduled; and mode four: configuring one RRC signaling for each user equipment for which cross-carrier scheduling can be performed, to indicate the CFI values of all component carriers which can be cross-carrier scheduled for the user, wherein, the component carriers which can be cross-carrier scheduled do not include the present carrier.

An order of ranking the overheads of the signalings and the signalings using the above modes is described as follows:

if the mode one is used, the number N of the RRC signalings of each user equipment is equal to the number of the component carriers which can be cross-carrier scheduled for the user equipment, and the N RRC signalings are ranked in an order of frequencies of the component carriers which can be cross-carrier scheduled for the user equipment from low to high or from high to low or values of carrier indicators (CI) from small to large or from large to small.

if mode two is used, the number M of the RRC signalings of each user equipment is equal to the number of the designated subframe types, and the M RRC signalings are ranked in an order of the predefined subframe types.

if mode three is used, the number P of the RRC signalings of each user equipment is determined by the number Q of the designated subframe types and a total number R of the component carriers which can be cross-carrier scheduled for the user equipment, i.e., P=Q×R.

A rule for ranking the P RRC signalings is as follows: Q RRC signalings in each component carrier are ranked in an order of the predefined subframe types, and Q RRC signalings respectively corresponding to the R component carriers are ranked in cascade in an order of sizes of carrier indicators (CI) or frequencies of the component carriers which can be cross-carrier scheduled for the user equipment.

If mode four is used, the number of RRC signalings of each user equipment is 1.

Wherein, for any one of the above modes, the overhead of one RRC signaling is 1 bit or 2 bits.

Alternatively, if the mode one or mode four is used, each RRC signaling and the subframe type of the component carrier corresponding to the RRC signaling jointly determine the CFI value of the component carrier, wherein, the subframe types here are divided into six classes; specifically, the first class of subframes are the subframe 1 and the subframe 6 of the frame structure type 2; the second class of subframes are Multicast Broadcast Single Frequency Network (MBSFN) subframes supporting PDSCH transmission and configured with 1 or 2 cell-specific antenna ports; the third class of subframes are MBSFN subframes supporting PDSCH transmission and configured with 4 cell-specific antenna ports; the fourth class of subframes are subframes not supporting PDSCH transmission; the fifth class of subframes are non-MBSFN frames configured with positioning reference signals excluding the subframe 6 of the frame structure type 2; and the sixth class of subframes are subframes of all other cases.

In mode one or mode four, if the overhead of one RRC signaling is 1 bit, according to the bandwidth of the component carriers, the subframe types of the component carriers and the state of the RRC signaling jointly determine the CFI values of various subframe types of the component carriers, specifically, when the bandwidth of the component carriers which can be cross-carrier scheduled is more than 10 physical resource blocks, one of two states of the RRC signaling of the 1 bit corresponds to one of two states in the following value combinations one by one according to the subframe types: if the bandwidth of the component carriers is more than 10 physical resource blocks, one of two states of the RRC signaling of the 1 bit corresponds to one of the following states one by one: all subframe types respectively correspond to one smaller CFI value or one greater CFI value, or all subframe types respectively correspond to the minimum CFI value or the maximum CFI value.

The smaller CFI value or greater CFI value can be the following combinations according to different subframe types: CFI values of the first class of subframes are (1, 2); CFI values of the second class of subframes are (1, 2); CFI values of the third class of subframes are (2, 2); CFI values of the fourth class of subframes are (0, 0); CFI values of the fifth class of subframes are (1, 2), (2, 3) or (1, 3); CFI values of the sixth class of subframes are (1, 2), (2, 3) or (1, 3); wherein, the former in the parentheses is the smaller CFI value and the later in the parentheses is the greater CFI value, or the former in the parentheses is the minimum CFI value and the later in the parentheses is the maximum CFI value.

If the bandwidth of the component carriers is not more than 10 physical resource blocks, one of two states of the RRC signaling of the 1 bit corresponds to one of the following states one by one: all subframe types respectively correspond to one smaller CFI value or one greater CFI value, or all subframe types respectively correspond to the minimum CFI value or the maximum CFI value.

The smaller CFI value or greater CFI value can be the following combinations according to different subframe types: CFI values of the first class of subframes are (2, 2); CFI values of the second class of subframes are (2, 2); CFI values of the third class of subframes are (2, 2); CFI values of the subframes not supporting the PDSCH transmission of the fourth class of subframes are (0, 0); CFI values of the fifth class of subframes are (2, 3); CFI values of the sixth class of subframes are (2, 3), (2, 4) or (3, 4); wherein, the former in the parentheses is the smaller CFI value and the later in the parentheses is the greater CFI value, or the former in the parentheses is the minimum CFI value and the later in the parentheses is the maximum CFI value.

In the mode one or mode four, if the overhead of one RRC signaling is 2 bits, according to the bandwidth of the component carriers, the subframe types of the component carriers and the state of the RRC signaling jointly determine the CFI values of various subframe types of the component carriers, specifically, if the bandwidth of the component carriers is more than 10 physical resource blocks, one of four states of the RRC signaling of the 2 bits corresponds to one of the following three states one by one: all subframe types respectively correspond to the minimum CFI value, one smaller CFI value, or the maximum CFI value.

The minimum CFI value, the smaller CFI value or the maximum CFI value can be the following combinations according to different subframe types: CFI values of the first class of subframes are (1, 2, 2) or (1, 1, 2); CFI values of the second class of subframes are (1, 2, 2) or (1, 1, 2); CFI values of the third class of subframes are (2, 2, 2); CFI values of the fourth class of subframes are (0, 0, 0); CFI values of the fifth class of subframes are (1, 2, 3); CFI values of the sixth class of subframes are (1, 2, 3). Wherein, the former in the parentheses is the minimum CFI value, the middle in the parentheses is the smaller CFI value, and the later in the parentheses is the maximum CFI value.

if the bandwidth of the component carriers is not more than 10 physical resource blocks, one of four states of the RRC signaling of the 2 bits corresponds to one of the following three states one by one: all subframe types respectively correspond to the minimum CFI value, one smaller CFI value, or the maximum CFI value.

The minimum CFI value, the smaller CFI value or the maximum CFI value can be the following combinations according to different subframe types: the CFI values of the first class of subframes are (2, 2, 2); the CFI values of the second class of subframes are (2, 2, 2); the CFI values of the third class of subframes are (2, 2, 2); the CFI values of the fourth class of subframes are (0, 0, 0); the CFI values of the fifth class of subframes are (2, 2, 3) or (2, 3, 3); the CFI values of the sixth class of subframes are (2, 3, 4). Wherein, the former in the parentheses is the minimum CFI value, the middle in the parentheses is the smaller CFI value, and the later in the parentheses is the maximum CFI value.

Specifically, when the overhead of the RRC signaling is 2 bits, one of the states of the 2 bits can be used to indicate that the CFI uses a dynamic indication mode, i.e., indicating it in the DCI.

If the mode two or mode three is used, the designated subframe type classifying strategy is any one of the following classifying strategies:

dividing the designated subframe types into two types, wherein, the first type of subframes comprise the subframe 1 and the subframe 6 of the frame structure type 2 and Multicast Broadcast Single Frequency Network (MBSFN) subframes supporting PDSCH transmission and configured with 1 or 2 cell-specific antenna ports, the second type of subframes comprise non-MBSFN frames configured with positioning reference signals excluding the subframe 6 of the frame structure type 2 and subframes of all other cases;

or, dividing the designated subframe types into three types according to the following classifying modes, wherein, classifying mode one: the first type of subframes comprise the subframe 1 and the subframe 6 of the frame structure type 2, the second type of subframes comprise MBSFN subframes supporting PDSCH transmission and configured with 1 or 2 cell-specific antenna ports, and the third type of subframes comprise non-MBSFN frames configured with positioning reference signals excluding the subframe 6 of the frame structure type 2 and subframes of all other cases;

classifying mode two: the first type of subframes comprise the subframe 1 and the subframe 6 of the frame structure type 2 and MBSFN subframes supporting PDSCH transmission and configured with 1 or 2 cell-specific antenna ports, the second type of subframes comprise non-MBSFN frames configured with positioning reference signals excluding the subframe 6 of the frame structure type 2, and the third type of subframes comprise subframes of all other cases; and or, dividing the designated subframe types into four types, wherein, the first type of subframes comprise the subframe 1 and the subframe 6 of the frame structure type 2, the second type of subframes comprise MBSFN subframes supporting PDSCH transmission and configured with 1 or 2 cell-specific antenna ports, and the third type of subframes comprise non-MBSFN frames configured with positioning reference signals excluding the subframe 6 of the frame structure type 2, and the fourth type of subframes comprise subframes of all other cases;

wherein, a CFI value of the MBSFN subframe supporting PDSCH transmission and configured with four cell-specific antenna ports is fixedly 2; and a CFI value of the subframe not supporting PDSCH transmission is fixedly 0;

the subframes of all other cases do not comprise: the subframe 1 and subframe 6 of the frame structure type 2, the MBSFN subframes supporting PDSCH transmission and configured with 1 or 2 cell-specific antenna ports, the non-MBSFN frames configured with positioning reference signals excluding the subframe 6 of the frame structure type 2, the MBSFN subframes supporting PDSCH transmission and configured with 4 cell-specific antenna ports, and the subframes not supporting PDSCH transmission.

When the above subframe type classifying strategies are used for the mode two or mode three, the meaning of the corresponding RRC signaling is described as follows:

when the designated subframe types are divided into two types, the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), (1, 3) or (2, 3), and when the bandwidth of the component carriers corresponding to the RRC signaling of the second type of subframes is not more than 10 physical resource blocks, one of two states of the 1 bit corresponds to one of two values of the CFI one by one, and the two values are (2, 3), (2, 4) or (3, 4); or the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the three values of the CFI are (1, 2, 3), and when the bandwidth of the component carriers corresponding to the RRC signaling of the second type of subframes is not more than 10 physical resource blocks, three of four states of the 2 bits determinately correspond to three or two values of the CFI, and the three values are (2, 3, 4), or the two values are (2, 3), (2, 4) or (3, 4).

When the designated subframe types are divided into three types according to the classifying mode one, the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values of the CFI are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values of the CFI are (1, 2), and when the bandwidth of the component carriers corresponding to the RRC signaling of the second type of subframes is not more than 10 physical resource blocks, the CFI value of the second type of subframes of the component carriers is fixedly 2;

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3), (2, 4) or (3, 4); or the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values of the CFI are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values of the CFI are (2, 3, 4), or three of four states of the 2 bits determinately correspond to two values of the CFI, and the two values of the CFI are (2, 3), (2, 4) or (3, 4).

When the designated subframe types are divided into three types according to the classifying mode two, the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values of the CFI are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling of the second type of subframes is not more than 10 physical resource blocks, one of two states of the 1 bit corresponds to one of two values of the CFI one by one, and the two values of the CFI are (2, 3); or, the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the two values of the CFI are (1, 2, 3), and when the bandwidth of the component carriers corresponding to the RRC signaling of the second type of subframes is not more than 10 physical resource blocks, three of four states of the 2 bits determinately corresponds to one of the two values of the CFI, and the two values of the CFI are (2, 3);

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values of the CFI are (2, 3), (2, 4) or (3, 4); or, the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values of the CFI are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values are (2, 3, 4).

When the designated subframe types are divided into four types, the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values of the CFI are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values of the CFI are (1, 2), and when the bandwidth of the component carriers corresponding to the RRC signaling of the second type of subframes is not more than 10 physical resource blocks, the CFI value of the second type of subframes of the component carriers is fixedly 2;

the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values of the CFI are (2, 3); or, the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values of the CFI are (1, 2, 3), and when the bandwidth of the component carriers corresponding to the RRC signaling of the third type of subframes is not more than 10 physical resource blocks, three of four states of the 2 bits determinately corresponds to one of two values of the CFI, and the two values of the CFI are (2, 3);

the overhead of the RRC signaling of the fourth type of subframes is 1 bit, and when the bandwidth of the component carriers corresponding to the RRC signaling of the fourth type of subframes is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling of the fourth type of subframes is not more than 10 physical resource blocks, one of two states of the 1 bit corresponds to one of two values of the CFI one by one, and the two values of the CFI are (2, 3), (2, 4) or (3, 4); or, the overhead of the RRC signaling of the fourth type of subframes is 2 bits, and when the bandwidth of the component carriers corresponding to the RRC signaling of the fourth type of subframes is more than 10 physical resource blocks, one of four states of the 2 bits corresponds to one of three values of the CFI one by one, and the two values of the CFI are (1, 2, 3), and when the bandwidth of the component carriers corresponding to the RRC signaling of the fourth type of subframes is not more than 10 physical resource blocks, one of four states of the 2 bits corresponds to one of three values of the CFI one by one, and the three values of the CFI are (2, 3, 4).

Wherein, the CFI value here indicates an initial OFDM symbol position of the PDSCH of the component carrier which is cross-carrier scheduled.

Figure 3:
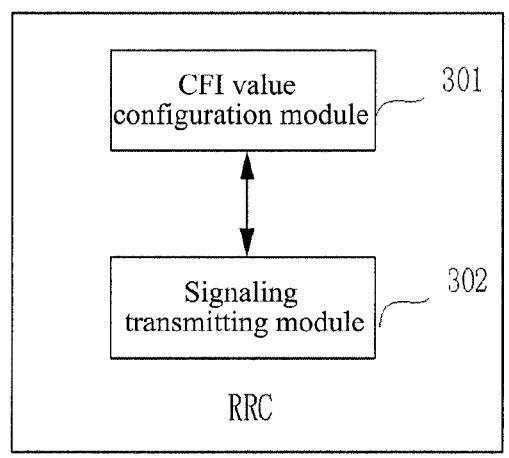
FIG. 3 is a diagram of an apparatus for transmitting control format indicator values provided by an embodiment of the present invention.

Corresponding to the above scheme, the present invention further provides an apparatus for transmitting control format indicator values, which is applied to a Radio Resource Control (RRC), as shown in FIG. 3, comprising a Control Format Indicator (CFI) value configuration module 301 and a signaling transmitting module 302, wherein, the CFI value configuration module 301 is set to configure the CFI values for component carriers which can be cross-carrier scheduled for user equipment by one of the following modes:

mode one: one RRC signaling is configured for each component carrier which can be cross-carrier scheduled for user equipment, to indicate a CFI value of each subframe of the component carrier which can be cross-carrier scheduled;

mode two: one RRC signaling is configured respectively for each of subframe types designated by all component carriers which can be cross-carrier scheduled for the user equipment according to a preset first subframe type classifying strategy, to indicate a CFI value of each of the subframe types designated by the component carriers which can be cross-carrier scheduled;

mode three: one RRC signaling is configured respectively for each of subframe types designated by each component carrier which can be cross-carrier scheduled for the user equipment according to the preset first subframe type classifying strategy, to indicate a CFI value of each of the subframe types designated by the component carrier which can be cross-carrier scheduled; and mode four: one RRC signaling is configured for each user equipment for which cross-carrier scheduling can be performed, to indicate the CFI values of all component carriers which can be cross-carrier scheduled for the user, wherein, the component carriers which can be cross-carrier scheduled do not include the present carrier; and the signaling transmitting module 302 is set to transmit the related signaling of the CFI value configured by the CFI value configuration module to a signaling receiving party. The present invention will be described in conjunction with specific embodiments hereinafter:

Embodiment One

A corresponding RRC signaling is configured respectively and independently for each component carrier which can be cross-carrier scheduled for the UE by the RRC, to indicate a CFI value of each component carrier.

Assume that the RRC signaling configures N component carriers which can be cross-carrier scheduled for the UE, i.e., CC1, CC2, . . . , CCN, the overhead of the RRC signalings related to the CFIs configured for the components carrier which can be cross-carrier scheduled for the UE are N bits, and each component carrier corresponds to 1 bit. The N-bit signalings are ranked in an order of frequencies of N component carriers or carrier indicator values configured by the RRC. If the bandwidth of the component carriers $N_{RB}^{DL}$ is more than 10 physical resource blocks, one of two states of the 1 bit corresponds to one of the following two states one by one:

all the subframe types respectively correspond to the minimum CFI value, and specifically, for the subframe 1 and the subframe 6 of the frame structure type 2, a CFI value is 1; for MBSFN subframes supporting PDSCH transmission and configured with 1 or 2 cell-specific antenna ports, a CFI value is 1; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 1; and for subframes of all other cases, a CFI value is 1;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for subframes of all other cases, a CFI value is 3.

If the bandwidth of the component carriers $N_{RB}^{DL}$ is not more than 10 physical resource blocks, one of two states of the RRC signaling of the 1 bit corresponds to one of the following two states one by one:

all the subframe types respectively correspond to the minimum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for subframes of all other cases, a CFI value is 4.

The above contents are described by a table as follows:

TABLE ONE bandwidth of the component carriers $N_{RB}^{DL} > 10$

| Subframes | The maximum number of the OFDM symbols of the PDCCH or a CFI value or an initial OFDM symbol index of the PDSCH | |
| --- | --- | --- |
| RRC signaling | 0 (1) | 1 (0) |
| subframe 1 and subframe 6 of frame structure type 2 | 1 | 2 |
| MBSFN subframes supporting PDSCH transmission and configured with 1 or 2 cell-specific antenna ports | 1 | 2 |
| MBSFN subframes supporting PDSCH transmission and configured with 4 cell-specific antenna ports | 2 | 2 |
| subframes not supporting PDSCH transmission | 0 | 0 |
| non-MBSFN subframes configured with positioning reference signals (PRS for short) (excluding the subframe 6 of the frame structure type 2) | 1 | 3 |
| all other cases | 1 | 3 |

TABLE TWO bandwidth of the component carriers $N_{RB}^{DL} \leq 10$

| Subframes | The maximum number of the OFDM symbols of the PDCCH or a CFI value or an initial OFDM symbol index of the PDSCH | |
| --- | --- | --- |
| RRC signaling | 0 (1) | 1 (0) |
| subframe 1 and subframe 6 of frame structure type 2 | 2 | 2 |
| MBSFN subframes supporting PDSCH transmission and configured with 1 or 2 cell-specific antenna ports | 2 | 2 |
| MBSFN subframes supporting PDSCH transmission and configured with 4 cell-specific antenna ports | 2 | 2 |
| subframes not supporting PDSCH transmission | 0 | 0 |
| non-MBSFN subframes configured with positioning reference signals (PRS for short) (excluding the subframe 6 of the frame structure type 2) | 2 | 3 |
| all other cases | 2 | 4 | or is overall represented as:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling | 0 (1) | 1 (0) | 0 (1) | 1 (0) |
| subframe 1 and subframe 6 of frame structure type 2 | 1 | 2 | 2 | 2 |
| MBSFN subframes supporting PDSCH transmission and configured with 1 or 2 cell-specific antenna ports | 1 | 2 | 2 | 2 |
| MBSFN subframes supporting PDSCH transmission and configured with 4 cell-specific antenna ports | 2 | 2 | 2 | 2 |
| subframes not supporting PDSCH transmission | 0 | 0 | 0 | 0 |
| non-MBSFN subframes configured with positioning reference signals (PRS for short) (excluding the subframe 6 of the frame structure type 2) | 1 | 3 | 2 | 3 |
| all other cases | 1 | 3 | 2 | 4 |

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Two

A corresponding RRC signaling is configured respectively and independently for each component carrier which can be cross-carrier scheduled for user equipment by the RRC, to indicate a CFI value of each component carrier.

Assume that the RRC signaling configures N component carriers which can be cross-carrier scheduled for the UE, i.e., CC1, CC2, . . . , CCN, the overhead of the RRC signalings related to the CFIs configured for the component carriers which can be cross-carrier scheduled for the UE are N bits, and each component carrier corresponds to 1 bit. The N-bit signalings are ranked in an order of frequencies of N component carriers or carrier indicator values configured by the RRC. One of two states of the 1 bit corresponds to one of the following two states one by one:

all the subframe types respectively correspond to one smaller CFI value, and specifically, for the subframe 1 and the subframe 6 of frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to one greater CFI value, and specifically, for the subframe 1 and the subframe 6 of frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3.

The above contents are described by a table as follows:

TABLE THREE relationship between the component carrier subframe type and the RRC CFI signaling (not related to the bandwidth)

| Subframes | A CFI value or an initial OFDM symbol index of the PDSCH | |
|---|---|---|
| RRC signaling | 0 (1) | 1 (0) |
| subframe 1 and subframe 6 of frame structure type 2 | 2 | 2 |
| MBSFN subframes supporting PDSCH transmission and configured with 1 or 2 cell-specific antenna ports | 2 | 2 |
| MBSFN subframes supporting PDSCH transmission and configured with 4 cell-specific antenna ports | 2 | 2 |
| subframes not supporting PDSCH transmission | 0 | 0 |
| non-MBSFN subframes configured with positioning reference signals (PRS for short) (excluding the subframe 6 of the frame structure type 2) | 2 | 3 |
| all other cases | 2 | 3 |

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Embodiment Three

A corresponding RRC signaling is configured respectively and independently for each component carrier which can be cross-carrier scheduled for the UE by the RRC, to indicate a CFI value of each component carrier.

Assume that the RRC signaling configures N component carriers which can be cross-carrier scheduled for the UE, i.e., CC1, CC2, . . . , CCN, the overhead of the RRC signalings related to the CFIs configured for the component carriers which can be cross-carrier scheduled for the UE are 2×N bits, and each component carrier corresponds to 2 bits. The N RRC signalings are ranked in an order of frequencies of N component carriers or carrier indicator values configured by the RRC. If the bandwidth of the component carriers $N_{RB}^{DL}$ is more than 10 physical resource blocks, one of four states of the 2 bits corresponds to one of the following three states one by one:

all the subframe types respectively correspond to the minimum CFI value, and specifically, for the subframe 1 and the subframe 6 of the frame structure type 2, a CFI value is 1; for MBSFN subframes supporting PDSCH transmission and configured with 1 or 2 cell-specific antenna ports, a CFI value is 1; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 1; and for all other cases, a CFI value is 1;

all the subframe types respectively correspond to one smaller CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3.

If the bandwidth of the component carriers $N_{RB}^{DL}$ is not more than 10 physical resource blocks, one of four states of the RRC signaling of the 2 bits corresponds to one of the following three states one by one:

all the subframe types respectively correspond to the minimum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to one smaller CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 4.

The above contents are described by a table as follows:

TABLE FOUR bandwidth of the component carriers $N_{RB}^{DL} > 10$

| Subframes | A CFI value or an initial OFDM symbol index of the PDSCH | | |
|---|---|---|---|
| RRC signaling (binary) | 00 | 01 | 10 |
| subframe 1 and subframe 6 of frame structure type 2 | 1 | 2 | 2 |
| MBSFN subframes supporting PDSCH transmission and configured with 1 or 2 cell-specific antenna ports | 1 | 2 | 2 |
| MBSFN subframes supporting PDSCH transmission and configured with 4 cell-specific antenna ports | 2 | 2 | 2 |
| subframes not supporting PDSCH transmission | 0 | 0 | 0 |
| non-MBSFN subframes configured with positioning reference signals (PRS for short) (excluding the subframe 6 of the frame structure type 2) | 1 | 2 | 3 |
| all other cases | 1 | 2 | 3 |

TABLE FIVE bandwidth of the component carriers $N_{RB}^{DL} \leq 10$

| Subframes | A CFI value or an initial OFDM symbol index of the PDSCH | | |
|---|---|---|---|
| RRC signaling (binary) | 00 | 01 | 10 |
| subframe 1 and subframe 6 of frame structure type 2 | 2 | 2 | 2 |
| MBSFN subframes supporting PDSCH transmission and configured with 1 or 2 cell-specific antenna ports | 2 | 2 | 2 |
| MBSFN subframes supporting PDSCH transmission and configured with 4 cell-specific antenna ports | 2 | 2 | 2 |

TABLE FIVE-continued bandwidth of the component carriers $N_{RB}^{DL} \leq 10$

| Subframes | A CFI value or an initial OFDM symbol index of the PDSCH | | |
|---|---|---|---|
| subframes not supporting PDSCH transmission | 0 | 0 | 0 |
| non-MBSFN subframes configured with positioning reference signals (PRS for short) (excluding the subframe 6 of the frame structure type 2) | 2 | 3 | 3 |
| all other cases | 2 | 3 | 4 |

The state of the bits remaining in the above tables 4 and 5 can be reserved, or can also be configured to indicate a CFI value through the signaling in the DCI carried in by the PDCCH.

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Four

An RRC signaling is configured uniformly for all component carriers which can be cross-carrier scheduled for the UE, and these component carriers share the corresponding RRC signaling for different designated subframe types, to indicate CFI values of different subframe types.

The different designated subframe types are divided into four types, specifically, For example, four RRC signalings are defined, which are used respectively to represent the subframe 1 and the subframe 6 of the frame structure type 2, MBSFN subframes supporting PDSCH transmission and configured with 1 or 2 cell-specific antenna ports, non-MBSFN subframes configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2, and for subframes not supporting PDSCH transmission, the CFI value is a fixed value 0. A total overhead of the RRC signalings is 4 bits or 5 bits or 6 bits, and these 4 RRC signalings are ranked in turn according to these 4 subframe types. The overheads of the RRC signaling of the first type of subframes and the second type of subframes are 1 bit respectively, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI values of the first type of subframes and the second type of subframes of the component carriers are a fixed value 2.

The overhead of the RRC signaling of the third type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and two values of the CFI are (1, 2), (1, 3) or (2, 3), and when the bandwidth of the component carriers corresponding to the RRC signaling of the second type of subframes is not more than 10 physical resource blocks, one of two states of the 1 bit corresponds to one of two values of the CFI one by one, and two values are (2, 3); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, three of four states of the 2 bits determinately corresponds to one of two values of the CFI, and the two values of the CFI are (2, 3).

The overhead of the RRC signaling of the fourth type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2) or (2, 3) or (1, 3), and when the bandwidth of the component carriers corresponding to the RRC signaling is not more than 10 physical resource blocks, one of two states of the 1 bit corresponds to one of two values of the CFI one by one, and two values of the CFI are (2, 3), (2, 4) or (3, 4). Or, the overhead of the RRC signaling of the fourth type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of three values of the CFI one by one, and the three values of the CFI are (2, 3, 4).

When the RRC signalings corresponding to the four types of subframes are all 1 bit, the above contents are represented by a table as follows:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 1 (1 bit) subframe 1 and subframe 6 of frame structure type 2 | 0 (1) 1 | 1 (0) 2 | 0 (1) 2 | 1 (0) 2 |
| RRC signaling 2 (1 bit) MBSFN subframes supporting PDSCH transmission and configured with 1 or 2 cell-specific antenna ports | 0 (1) 1 | 1 (0) 2 | 0 (1) 2 | 1 (0) 2 |

-continued

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| MBSFN subframes supporting PDSCH transmission and configured with 4 cell-specific antenna ports | 2 | 2 | 2 | 2 |
| subframes not supporting PDSCH transmission | 0 | 0 | 0 | 0 |
| RRC signaling 3 (1 bit) non-MBSFN subframes configured with positioning reference signals (PRS for short) (excluding the subframe 6 of the frame structure type 2) | 0 (1) 1 | 1 (0) 3 | 0 (1) 2 | 1 (0) 3 |
| RRC signaling 4 (1 bit) all other cases | 0 (1) 1 | 1 (0) 3 | 0 (1) 2 | 1 (0) 4 |

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Five

A RRC signaling is configured uniformly for all component carriers which can be cross-carrier scheduled for the UE, and these component carriers share the corresponding RRC signaling for different designated subframe types, to indicate CFI values of different subframe types.

The different designated subframe types are divided into three types according to the classifying mode one.

For example, three RRC signalings are defined, which are respectively used to represent the subframe 1 and the subframe 6 of the frame structure type 2, MBSFN subframes supporting PDSCH transmission and configured with 1 or 2 cell-specific antenna ports, and non-MBSFN subframes configured with positioning reference signals (PRS for short) (excluding the subframe 6 of the frame structure type 2) and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. A total overhead of the RRC signaling is 3 bits or 4 bits, and these 3 RRC signalings are ranked in turn according to these 3 subframe types. The overheads of the RRC signaling of the first type of subframes and the second type of subframes are 1 bit respectively, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI values of the first type of subframes and the second type of subframes of the component carriers are a fixed value 2. The overhead of the RRC signaling of the third type of subframes is also 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3). When the bandwidth of the component carriers corresponding to the RRC signaling is not more than 10 physical resource blocks, one of two states of the 1 bit corresponds to one of two values of the CFI one by one, and the two values of the CFI are (2, 3) or (2, 4) or (3, 4); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of the three values of the CFI one by one, and the three values of the CFI are (2, 3, 4), or three of four states of the 2 bits determinately correspond to two values of the CFI, and the two values of the CFI are (2, 3).

When the RRC signalings corresponding to the three types of subframes are all 1 bit, the above contents are represented by a table as follows:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 1 (1 bit) subframe 1 and subframe 6 of frame structure type 2 | 0 (1) 1 | 1 (0) 2 | 0 (1) 2 | 1 (0) 2 |

-continued

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 2 (1 bit) | 0 (1) | 1 (0) | 0 (1) | 1 (0) |
| MBSFN subframes supporting PDSCH transmission and configured with 1 or 2 cell-specific antenna ports | 1 | 2 | 2 | 2 |
| MBSFN subframes supporting PDSCH transmission and configured with 4 cell-specific antenna ports | 2 | 2 | 2 | 2 |
| subframes not supporting PDSCH transmission | 0 | 0 | 0 | 0 |
| RRC signaling 3 (1 bit) | 0 (1) | 1 (0) | 0 (1) | 1 (0) |
| non-MBSFN subframes configured with positioning reference signals (PRS for short) (excluding the subframe 6 of the frame structure type 2) | 1 | 3 | 2 | 3 |
| all other cases | 1 | 3 | 2 | 4 |

In the apparatus for transmitting CFI values provided by the present invention, the CFI value configuration module included in the RRC is configured to respectively and independently configure corresponding RRC signalings for each component carrier which can be cross-carrier scheduled for user equipment through the above method process, to indicate a CFI value of each component carrier.

Wherein, the component carriers which can be cross-carrier scheduled do not include the present carrier.

Embodiment Six

A RRC signaling is configured uniformly for all component carriers which can be cross-carrier scheduled for the UE, and these component carriers share the corresponding RRC signaling for different designated subframe types, to indicate CFI values of different subframe types.

The different designated subframe types are divided into three types according to the classifying mode two.

For example, three RRC signalings are defined, which are used to represent the subframe 1 and the subframe 6 of the frame structure type 2, MBSFN subframes supporting PDSCH transmission and configured with 1 or 2 cell-specific antenna ports, and non-MBSFN frames configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2, and for subframes not supporting PDSCH transmission, the CFI value is a fixed value 0. A total overhead of the RRC signalings is 3 bits or 4 bits or 5 bits, and these 3 RRC signalings are ranked in turn according to these 3 subframe types. Specifically, The overhead of the RRC signaling of the first type of subframes is 1 bit, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI value of the first type of subframes of the component carriers is a fixed value 2.

The overhead of the RRC signaling of the second type of subframes is 1 bit, and when the bandwidth of the component carriers corresponding to the RRC signaling is more than 10 physical resource blocks, one of two states of the 1 bit corresponds to one of two values of the CFI one by one, and two values of the CFI are (1, 2), (2, 3) or (1, 3). When the bandwidth of the component carriers corresponding to the RRC signaling is not more than 10 physical resource blocks, one of two states of the 1 bit corresponds to one of two values of the CFI one by one, and the two values of the CFI are (2, 3); or the overhead of the RRC signaling of the second type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, three of four states of the 2 bits determinately corresponds to one of two values of the CFI, and the two values of the CFI are (2, 3).

The overhead of the RRC signaling of the third type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3). When the bandwidth of the component carriers corresponding to the RRC signaling is not more than 10 physical resource blocks, one of two states of the 1 bit corresponds to one of two values of the CFI one by one, and the two values of the CFI are (2, 3) or (2, 4) or (3, 4); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of three values of the CFI one by one, and the three values of the CFI are (2, 3, 4).

When the RRC signalings corresponding to the three types of subframes are all 1 bit, the above contents are represented by a table as follows:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 1 (1 bit) subframe 1 and subframe 6 of frame structure type 2 | 0 (1) 1 | 1 (0) 2 | 0 (1) 2 | 1 (0) 2 |
| MBSFN subframes supporting PDSCH transmission and configured with 1 or 2 cell-specific antenna ports | 1 | 2 | 2 | 2 |
| MBSFN subframes supporting PDSCH transmission and configured with 4 cell-specific antenna ports | 2 | 2 | 2 | 2 |
| subframes not supporting PDSCH transmission | 0 | 0 | 0 | 0 |
| RRC signaling 2 (1 bit) non-MBSFN subframes configured with positioning reference signals (PRS for short) (excluding the subframe 6 of the frame structure type 2) | 0 (1) 1 | 1 (0) 3 | 0 (1) 2 | 1 (0) 3 |
| RRC signaling 3 (1 bit) all other cases | 0 (1) 1 | 1 (0) 3 | 0 (1) 2 | 1 (0) 4 |

Alternatively, when the RRC signalings of the second type of subframes and the third type of subframes are all 2 bits and the RRC signaling of the first type of subframes is 1 bit, the above contents are represented by a table as follows:

| Subframes | The maximum number of the OFDM symbols of the PDCCH or a CFI value or an initial OFDM symbol index of the PDSCH | | | | | |
|---|---|---|---|---|---|---|
| | bandwidth of the component carriers $N_{RB}^{DL} > 10$ | | | bandwidth of the component carriers $N_{RB}^{DL} \leq 10$ | | |
| RRC signaling 1 (1 bit) subframe 1 and subframe 6 of frame structure type 2 | 0 (1) 1 | | 1 (0) 2 | 0 (1) 2 | | 1 (0) 2 |
| MBSFN subframes supporting PDSCH transmission and configured with 1 or 2 cell-specific antenna ports | 1 | | 2 | 2 | | 2 |
| MBSFN subframes supporting PDSCH transmission and configured with 4 cell-specific antenna ports | 2 | | 2 | 2 | | 2 |
| subframes not supporting PDSCH transmission | 0 | | 0 | 0 | | 0 |
| RRC signaling 2 (2 bits) non-MBSFN subframes configured with positioning reference signals (PRS for short) (excluding the subframe 6 of the frame structure type 2) | 00 1 | 01 2 | 10 3 | 00 2 | 01 3 | 10 3 |
| RRC signaling 3 (2 bits) all other cases | 00 1 | 01 2 | 10 3 | 00 2 | 01 3 | 10 4 |

In the apparatus for transmitting CFI values provided by the present invention, the CFI value configuration module included in the RRC is configured to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Seven

A RRC signaling is configured uniformly for all component carriers which can be cross-carrier scheduled for the UE, and these component carriers share the corresponding RRC signaling for different designated subframe types, to indicate CFI values of different subframe types.

The different designated subframe types are divided into two types, specifically, For example, two RRC signalings are defined, which are used to respectively represent the subframe 1 and the subframe 6 of the frame structure type 2, MBSFN subframes supporting PDSCH transmission and configured with 1 or 2 cell-specific antenna ports, and non-MBSFN subframes configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. A total overhead of the RRC signaling is 2 bits or 3 bits, and these 2 RRC signalings are ranked in turn according to these 2 subframe types. The overhead of the RRC signaling of the first type of subframes is 1 bit, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI value of the first type of subframes of the component carriers is a fixed value 2.

The overhead of the RRC signaling of the second type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (1, 3) or (2, 3). When the bandwidth of the component carriers corresponding to the RRC signaling is not more than 10 physical resource blocks, one of two states of the 1 bit corresponds to one of two values of the CFI one by one, and the two values of the CFI are (2, 3); or the overhead of the RRC signaling of the second type of subframes is 2 bits, and when the bandwidth of the component carriers corresponding to the RRC signaling is more than 10 physical resource blocks, one of four states of the 2 bits corresponds to one of three values of the CFI one by one, and the three values of the CFI are (1, 2, 3), and when the bandwidth of the component carriers corresponding to the RRC signaling is not more than 10 physical resource blocks, three of four states of the 2 bits determinately correspond to three or two values of the CFI, and the three values of the CFI are (2, 3, 4) or the two values of the CFI are (2, 3).

When the overheads of the RRC signalings of the first type of subframes and the second type of subframes are 1 bit respectively, the above contents are represented by a table as follows:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 1 (1 bit) | 0 (1) | 1 (0) | 0 (1) | 1 (0) |
| subframe 1 and subframe 6 of frame structure type 2 | 1 | 2 | 2 | 2 |
| MBSFN subframes supporting PDSCH transmission and configured with 1 or 2 cell-specific antenna ports | 1 | 2 | 2 | 2 |
| MBSFN subframes supporting PDSCH transmission and configured with 4 cell-specific antenna ports | 2 | 2 | 2 | 2 |
| subframes not supporting PDSCH transmission | 0 | 0 | 0 | 0 |
| RRC signaling 2 (1 bit) | 0 (1) | 1 (0) | 0 (1) | 1 (0) |
| non-MBSFN subframes configured with positioning reference signals (PRS for short) (excluding the subframe 6 of the frame structure type 2) | 1 | 3 | 2 | 3 |
| all other cases | 1 | 3 | 2 | 4 |

Alternatively, when the overhead of the RRC signalings of the first type of subframes are 1 bit and the overhead of the RRC signaling of the second type of subframes is 2 bits, the above contents are represented by a table as follows:

| Subframes | The maximum number of the OFDM symbols of the PDCCH or a CFI value or an initial OFDM symbol index of the PDSCH | | | |
|---|---|---|---|---|
| | bandwidth of the component carriers $N_{RB}^{DL} > 10$ | | bandwidth of the component carriers $N_{RB}^{DL} \leq 10$ | |
| RRC signaling 1 (1 bit) | 0 (1) | 1 (0) | 0 (1) | 1 (0) |
| subframe 1 and subframe 6 of frame structure type 2 | 1 | 2 | 2 | 2 |
| MBSFN subframes supporting PDSCH transmission and configured with 1 or 2 cell-specific antenna ports | 1 | 2 | 2 | 2 |

-continued

| Subframes | The maximum number of the OFDM symbols of the PDCCH or a CFI value or an initial OFDM symbol index of the PDSCH | | | | | |
|---|---|---|---|---|---|---|
| | bandwidth of the component carriers $N_{RB}^{DL} > 10$ | | | bandwidth of the component carriers $N_{RB}^{DL} \leq 10$ | | |
| MBSFN subframes supporting PDSCH transmission and configured with 4 cell-specific antenna ports | 2 | | 2 | 2 | | 2 |
| subframes not supporting PDSCH transmission | 0 | | 0 | 0 | | 0 |
| RRC signaling 2 (2 bits) | 00 | 01 | 10 | 00 | 01 | 10 |
| non-MBSFN subframes configured with positioning reference signals (PRS for short) (excluding the subframe 6 of the frame structure type 2) | 1 | 2 | 3 | 2 | 3 | 3 |
| all other cases | 1 | 2 | 3 | 2 | 3 | 4 |

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Eight

A corresponding RRC signaling is respectively and independently configured for different designated subframe types of each component carrier which can be cross-carrier scheduled for the UE, to indicate CFI values of the different designated subframe types of each component carrier. Assume that the number of component carriers which can be cross-carrier scheduled for the UE is N.

The different designated subframe types are divided into two types, specifically, For example, two RRC signalings are defined for each component carrier which can be cross-carrier scheduled, which are used to respectively represent the subframe 1 and the subframe 6 of the frame structure type 2, MBSFN subframes supporting PDSCH transmission and configured with 1 or 2 cell-specific antenna ports, and non-MBSFN subframes configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. There are a total of 2N RRC signalings for the N component carriers, and a total overhead of the RRC signalings is 2N bits or 3N bits, and the rule for ranking these 2N RRC signalings is as follows: 2 RRC signalings in each component carrier are ranked in an order of the predefined subframe types, and 2 RRC signalings respectively corresponding to N component carriers are ranked in cascade in an order of sizes of carrier indicators (CI) or frequencies of the component carriers which can be cross-carrier scheduled for the user equipment.

The overhead of the RRC signaling of the first type of subframes is 1 bit, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI value of the first type of subframes of the component carriers is a fixed value 2.

The overhead of the RRC signaling of the second type of subframes is 1 bit, and when the bandwidth of the component carriers corresponding to the RRC signaling is more than 10 physical resource blocks, one of two states of the 1 bit corresponds to one of two values of the CFI one by one, and two values of the CFI are (1, 2), (1, 3) or (2, 3). When the bandwidth of the component carriers corresponding to the RRC signaling is not more than 10 physical resource blocks, one of two states of the 1 bit corresponds to one of two values of the CFI one by one, and the two values of the CFI are (2, 3); or the overhead of the RRC signaling of the second type of subframes is 2 bits, and when the bandwidth of the component carriers corresponding to the RRC signaling is more than 10 physical resource blocks, one of four states of the 2 bits corresponds to one of three values of the CFI one by one, and the three values of the CFI are (1, 2, 3), and when the bandwidth of the component carriers corresponding to the RRC signaling is not more than 10 physical resource blocks, three of four states of the 2 bits determinately correspond to three or two values of the CFI, and the three values of the CFI are (2, 3, 4) or the two values of the CFI are (2, 3).

In the apparatus for transmitting CFI values provided by the present invention, the CFI value configuration module included in the RRC is set to respectively and independently configure corresponding RRC signalings for each component carrier which can be cross-carrier scheduled for user equipment through the above method process, to indicate a CFI value of each component carrier.

Wherein, the component carriers which can be cross-carrier scheduled do not include the present carrier.

Embodiment Nine

A corresponding RRC signaling is respectively and independently configured for different designated subframe types of each component carrier which can be cross-carrier scheduled for the UE, to indicate CFI values of the different designated subframe types of each component carrier. Assume that the number of component carriers which can be cross-carrier scheduled for the UE is N.

The different designated subframe types are divided into three types according to the classifying mode one. Specifically, For example, three RRC signalings are defined, which are used to respectively represent the subframe 1 and the subframe 6 of the frame structure type 2, MBSFN subframes supporting PDSCH transmission and configured with 1 or 2 cell-specific antenna ports, and non-MBSFN subframes configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. There are a total of 3N RRC signalings for the N component carriers, and a total overhead of the RRC signalings is 3N bits or 4N bits, and the rule for ranking these 3N RRC signalings is as follows: 3 RRC signalings in each component carrier are ranked in an order of the predefined subframe types, and 3 RRC signalings respectively corresponding to N component carriers are ranked in cascade in an order of sizes of carrier indicators (CI) or frequencies of the component carriers which can be cross-carrier scheduled for the user equipment. The overheads of the RRC signalings of the first type of subframes and the second type of subframes are 1 bit respectively, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI values of the first type of subframes and the second type of subframes of the component carriers are a fixed value 2.

The overhead of the RRC signaling of the third type of subframes is also 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3). When the bandwidth of the component carriers corresponding to the RRC signaling is not more than 10 physical resource blocks, one of two states of the 1 bit corresponds to one of two values of the CFI one by one, and the two values of the CFI are (2, 3) or (2, 4) or (3, 4); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of the three values of the CFI one by one, and the three values of the CFI are (2, 3, 4), or three of four states of the 2 bits determinately correspond to two values of the CFI, and the two values of the CFI are (2, 3).

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Ten

A corresponding RRC signaling is respectively and independently configured for different designated subframe types of each component carrier which can be cross-carrier scheduled for the UE, to indicate CFI values of the different designated subframe types of each component carrier. Assume that the number of component carriers which can be cross-carrier scheduled for the UE is N.

The different designated subframe types are divided into three types according to the classifying mode two. Specifically, For example, three RRC signalings are defined, which are used to respectively represent the subframe 1 and the subframe 6 of the frame structure type 2, MBSFN subframes supporting PDSCH transmission and configured with 1 or 2 cell-specific antenna ports, and non-MBSFN subframes configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. There are a total of 3N RRC signalings for the N component carriers, and a total overhead of the RRC signalings is 3N bits or 4N bits or 5N bits, and the rule for ranking these 3N RRC signalings is as follows: 3 RRC signalings in each component carrier are ranked in an order of the predefined subframe types, and 3 RRC signalings respectively corresponding to N component carriers are ranked in cascade in an order of sizes of carrier indicators (CI) or frequencies of the component carriers which can be cross-carrier scheduled for the user equipment. Specifically, the overhead of the RRC signaling of the first type of subframes is 1 bit, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI value of the first type of subframes of the component carriers is a fixed value 2.

The overhead of the RRC signaling of the second type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3). When the bandwidth of the component carriers corresponding to the RRC signaling is not more than 10 physical resource blocks, one of two states of the 1 bit corresponds to one of two values of the CFI one by one, and the two values of the CFI are (2, 3); or the overhead of the RRC signaling of the second type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, three of four states of the 2 bits determinately corresponds to one of the two values of the CFI, and the two values of the CFI are (2, 3).

The overhead of the RRC signaling of the third type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3), when the bandwidth of the component carriers corresponding to the RRC signaling is not more than 10 physical resource blocks, one of two states of the 1 bit corresponds to one of two values of the CFI one by one, and the two values of the CFI are (2, 3) or (2, 4) or (3, 4); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of three values of the CFI one by one, and the three values of the CFI are (2, 3, 4).

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Eleven

A corresponding RRC signaling is respectively and independently configured for different designated subframe types of each component carrier which can be cross-carrier scheduled for the UE, to indicate CFI values of the different designated subframe types of each component carrier. Assume that the number of component carriers which can be cross-carrier scheduled for the UE is N.

The different designated subframe types are divided into four types according to the classifying mode two, specifically, For example, four RRC signalings are defined, which are used to respectively represent the subframe 1 and the subframe 6 of the frame structure type 2, MBSFN subframes supporting PDSCH transmission and configured with 1 or 2 cell-specific antenna ports, and non-MBSFN frames configured with positioning reference signals (PRS for short) (excluding the subframe 6 of the frame structure type 2), and all other cases, wherein, for MBSFN subframes supporting PDSCH transmission and configured with four cell-specific antenna ports, the CFI value is a fixed value 2 and for subframes not supporting PDSCH transmission, the CFI value is a fixed value 0. There are a total of 4N RRC signalings for the N component carriers, and a total overhead of the RRC signalings is 4N bits or 5N bits or 6N bits, and the rule for ranking these 4N RRC signalings is as follows: 4 RRC signalings in each component carrier are ranked in an order of the predefined subframe types, and 4 RRC signalings corresponding to N component carriers are ranked in cascade in an order of sizes of carrier indicators (CI) or frequencies of the component carriers which can be cross-carrier scheduled for the user equipment. The overheads of the RRC signaling of the first type of subframes and the second type of subframes are 1 bit respectively, when the bandwidth of the component carriers corresponding to the RRC signaling is more than 10 physical resource blocks, one of two states of the 1 bit corresponds to one of two values of the CFI one by one, and the two values of the CFI are (1, 2), and when the bandwidth of the component carriers corresponding to the RRC signaling is not more than 10 physical resource blocks, the CFI values of the first type of subframes and the second type of subframes of the component carriers are a fixed value 2.

The overhead of the RRC signaling of the third type of subframes is 1 bit, and when the bandwidth of the component carriers corresponding to the RRC signaling is more than 10 physical resource blocks, one of two states of the 1 bit corresponds to one of two values of the CFI one by one, and the two values of the CFI are (1, 2), (2, 3) or (1, 3), and when the bandwidth of the component carriers corresponding to the RRC signaling is not more than 10 physical resource blocks, one of two states of the 1 bit corresponds to one of two values of the CFI one by one, and the two values are (2, 3); or the overhead of the RRC signaling of the third type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, three of four states of the 2 bits determinately corresponds to one of two values of the CFI, and the two values of the CFI are (2, 3).

The overhead of the RRC signaling of the fourth type of subframes is 1 bit, and when the bandwidth of the component carriers corresponding to the RRC signaling is more than 10 physical resource blocks, one of two states of the 1 bit corresponds to one of two values of the CFI one by one, and the two values are (1, 2) or (2, 3) or (1, 3), and when the bandwidth of the component carriers corresponding to the RRC signaling is not more than 10 physical resource blocks, one of two states of the 1 bit corresponds to one of two values of the CFI one by one, and the two values of the CFI are (2, 3), (2, 4) or (3, 4). Or, the overhead of the RRC signaling of the fourth type of subframes is 2 bits, and when the bandwidth of the component carriers corresponding to the RRC signaling is more than 10 physical resource blocks, one of four states of the 2 bits corresponds to one of three values of the CFI one by one, and the two values of the CFI are (1, 2, 3), and when the bandwidth of the component carriers corresponding to the RRC signaling is not more than 10 physical resource blocks, one of four states of the 2 bits corresponds to one of three values of the CFI one by one, and the three values of the CFI are (2, 3, 4).

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Twelve

One RRC signaling is configured for each UE for which the cross-carrier scheduling can be performed, to indicate CFI values of all component carriers which can be cross-carrier scheduled for the user.

Assume that the RRC signaling configures N component carriers which can be cross-carrier scheduled for the UE, i.e., CC1, CC2, . . . , CCN, the overhead of the RRC signalings related to the CFIs configured for the component carriers which can be cross-carrier scheduled for the UE are N bits, and a total overhead of the RRC signalings of the UE is 1 bit.

If the bandwidth of the component carriers $N_{RB}^{DL}$ is more than 10 physical resource blocks, one of two states of the 1 bit corresponds to one of the following two states one by one:

all the subframe types respectively correspond to the minimum CFI value, and specifically, for the subframe 1 and the subframe 6 of the frame structure type 2, a CFI value is 1; for MBSFN subframes supporting PDSCH transmission and configured with 1 or 2 cell-specific antenna ports, a CFI value is 1; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 1; and for all other cases, a CFI value is 1;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3.

If the bandwidth of the component carriers $N_{RB}^{DL}$ is not more than 10 physical resource blocks, one of two states of the RRC signaling of the 1 bit corresponds to one of the following two states one by one:

all the subframe types respectively correspond to the minimum CFI value, and specifically, for subframe 1 and subframe 6 of frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 4.

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

Embodiment Thirteen

One RRC signaling is configured for each UE for which the cross-carrier scheduling can be performed, to indicate CFI values of all component carriers which can be cross-carrier scheduled for the user.

Assume that the RRC signaling configures N component carriers which can be cross-carrier scheduled for the UE, i.e., CC1, CC2, . . . , CCN, the overhead of the RRC signaling related to the CFIs configured for the UE is 2 bits. If the bandwidth of the component carriers $N_{RB}^{DL}$ is more than 10 physical resource blocks, one of four states of the 2 bits corresponds to one of the following three states one by one:

all the subframe types respectively correspond to the minimum CFI value, and specifically, for the subframe 1 and the subframe 6 of the frame structure type 2, a CFI value is 1; for MBSFN subframes supporting PDSCH transmission and configured with 1 or 2 cell-specific antenna ports, a CFI value is 1; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 1; and for all other cases, a CFI value is 1;

all the subframe types respectively correspond to one smaller CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3.

If the bandwidth of the component carriers $N_{RB}^{DL}$ is not more than 10 physical resource blocks, one of four states of the RRC signaling of the 2 bits corresponds to one of the following three states one by one:

all the subframe types respectively correspond to the minimum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 2; and for all other cases, a CFI value is 2;

all the subframe types respectively correspond to one smaller CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 3;

all the subframe types respectively correspond to the maximum CFI value, and specifically, for the subframe 1 and the subframe 6 of the frame structure type 2, a CFI value is 2; for MBSFN subframes supporting PDSCH transmission and configured with 1 or 2 cell-specific antenna ports, a CFI value is 2; for MBSFN subframes supporting PDSCH transmission and configured with 4 cell-specific antenna ports, a CFI value is 2; for subframes not supporting PDSCH transmission, a CFI value is 0; for non-MBSFN frames configured with positioning reference signals (PRS for short) excluding the subframe 6 of the frame structure type 2, a CFI value is 3; and for all other cases, a CFI value is 4.

In the apparatus for transmitting CFI values provided by the present invention, the CFI value configuration module included in the RRC is set to respectively and independently configure a corresponding RRC signaling for each component carrier which can be cross-carrier scheduled for user equipment through the above method process, to indicate a CFI value of each component carrier.

Wherein, the component carriers which can be cross-carrier scheduled do not include the present carrier.

A person having ordinary skill in the art can understand that all or part of steps in the above embodiments can be implemented by computer program flows, and the computer programs can be stored in one computer readable storage medium and are performed on a corresponding hardware platform (such as a system, a device, an apparatus, an equipment etc.), and when being performed, the computer programs comprise one of steps of method embodiments or a combination thereof.

Alternatively, all or part of steps in the above embodiments can also be implemented by integrated circuits. These steps can be implemented by being made into various integrated circuit modules respectively, or multiple modules or steps therein are made into a single integrated circuit module. Thus, the present invention is not limited to any particular form of a combination of hardware and software.

Various apparatuses/functional modules/functional units in the above embodiments can be implemented using general computer apparatuses, which can be integrated on a single computer apparatus, or can also be distributed over a network consisting of multiple computer apparatuses.

When being implemented in a form of software functional modules and being sold or used as an independent product, various apparatuses/functional modules/functional units in the above embodiments can be stored in one computer readable storage medium. The above referred computer readable storage medium can be a read-only memory, a disk, or a disc etc.

The above description is only the preferred embodiments of the present invention, but the protection scope of the present invention is not limited thereto. Any variation or substitution, which can be easily thought of by any skilled person familiar with the present technical field within the technical scope disclosed by the present invention, should be contained within the protection scope of the present invention. Therefore, the protection scope of the present invention should be based on the protection scope described in the claims.

INDUSTRIAL APPLICABILITY

The method for transmitting CIF values provided by the present invention describes how the RRC specifically configures CFI values during the cross-carrier scheduling. By defining the CFI value configuration mode, defining the overhead of the signaling and defining CFI value configuration modes of various subframe types, the problem that the CFI configuration in the component carrier can not be managed in the related art is solved.

The present invention can be implemented on a corresponding hardware platform (such as a system, a device, an apparatus, an equipment etc.) by using computer program flows stored in the computer readable storage medium, or can also be implemented by using integrated circuits. Various apparatuses/functional modules/functional units in the embodiments can be implemented using general computer apparatuses, they can be integrated on a single computer apparatus, or can also be distributed over a network consisting of multiple computer apparatuses. When being implemented in a form of software functional modules and being sold or used as an independent product, various apparatuses/functional modules/functional units in the above embodiments can be stored in one computer readable storage medium.

Therefore, the method and apparatus provided by the present invention can be used and manufactured in industry, which solve corresponding technical problems in the prior art, achieve expected technical effects, and have industrial applicability.

What is claimed is:

1. A method for transmitting Control Format Indicator (CFI) values, comprising:

a Radio Resource Control (RRC) configuring CFI values for component carriers which can be cross-carrier scheduled for user equipment and transmitting related signalings of the CFI values, wherein, the mode of the RRC configuring the CFI values for the component carriers which can be cross-carrier scheduled for the user equipment is one of the following modes:

mode one: configuring one RRC signaling for each component carrier which can be cross-carrier scheduled for the user equipment, to indicate a CFI value of each subframe of the component carrier which can be cross-carrier scheduled;

mode two: configuring one RRC signaling respectively for each of subframe types designated by all component carriers which can be cross-carrier scheduled for the user equipment according to a preset first subframe type classifying strategy, to indicate a CFI value of each of the subframe types designated by the component carriers which can be cross-carrier scheduled;

mode three: configuring one RRC signaling respectively for each of subframe types designated by each component carrier which can be cross-carrier scheduled for the user equipment according to a preset first subframe type classifying strategy, to indicate a CFI value of each of the subframe types designated by the component carrier which can be cross-carrier scheduled; and mode four: configuring one RRC signaling for each user equipment for which cross-carrier scheduling can be performed, to indicate the CFI values of all component carriers which can be cross-carrier scheduled for the user, wherein, the component carriers which can be cross-carrier scheduled do not include the present carrier; and wherein, in the mode two or mode three, the first subframe type classifying strategy is one of the following classifying strategies:

a first type classifying strategy: dividing the designated subframe types into two types, wherein, a first type of subframes comprise a subframe 1 and a subframe 6 of a frame structure type 2 and Multicast Broadcast Single Frequency Network (MBSFN) subframes supporting PDSCH transmission and configured with 1 or 2 cell-specific antenna ports, a second type of subframes comprise non-MBSFN frames configured with positioning reference signals excluding the subframe 6 of the frame structure type 2 and subframes of all other cases;

a second type classifying strategy: dividing the designated subframe types into three types according to the following classifying modes, wherein, classifying mode one: a first type of subframes comprise a subframe 1 and a subframe 6 of a frame structure type 2, a second type of subframes comprise MBSFN subframes supporting PDSCH transmission and configured with 1 or 2 cell-specific antenna ports, and a third type of subframes comprise non-MBSFN frames configured with positioning reference signals excluding the subframe 6 of the frame structure type 2 and subframes of all other cases;

classifying mode two: a first type of subframes comprise a subframe 1 and a subframe 6 of a frame structure type 2 and MBSFN subframes supporting PDSCH transmission and configured with 1 or 2 cell-specific antenna ports, a second type of subframes comprise non-MBSFN frames configured with positioning reference signals excluding the subframe 6 of the frame structure type 2, and a third type of subframes comprise subframes of all other cases; and a third type classifying strategy: dividing the designated subframe types into four types, wherein, a first type of subframes comprise a subframe 1 and a subframe 6 of a frame structure type 2, a second type of subframes comprise MBSFN subframes supporting PDSCH transmission and configured with 1 or 2 cell-specific antenna ports, and a third type of subframes comprise non-MBSFN frames configured with positioning reference signals excluding the subframe 6 of the frame structure type 2, and a fourth type of subframes comprise subframes of all other cases;

wherein, a CFI value of MBSFN subframes supporting PDSCH transmission and configured with four cell-specific antenna ports is fixedly 2; and a CFI value of subframes not supporting PDSCH transmission is fixedly 0;

the subframes of all other cases do not comprise: the subframe 1 and subframe 6 of the frame structure type 2, the MBSFN subframes supporting PDSCH transmission and configured with 1 or 2 cell-specific antenna ports, the non-MBSFN frames configured with positioning reference signals excluding the subframe 6 of the frame structure type 2, the MBSFN subframes supporting PDSCH transmission and configured with 4 cell-specific antenna ports, and the subframes not supporting PDSCH transmission.

2. The method according to claim 1, wherein, in the mode one, a number N of the RRC signalings of each user equipment is equal to a number of the component carriers which can be cross-carrier scheduled for the user equipment, and the N RRC signalings are ranked in an order of sizes of carrier indicators (CI) or frequencies of the component carriers which can be cross-carrier scheduled for the user equipment.

3. The method according to claim 2, wherein, the mode one or mode four further comprises:

according to a preset second subframe type classifying strategy, the RRC signaling and the subframe type of the component carrier corresponding to the RRC signaling jointly determine the CFI value of the component carrier, wherein, the subframe types in the second subframe type classifying strategy totally comprise the following six classes: a first class of subframes comprise a subframe 1 and a subframe 6 of a frame structure type 2; a second class of subframes comprise Multicast Broadcast Single Frequency Network (MBSFN) subframes supporting PDSCH transmission and configured with 1 or 2 cell-specific antenna ports; a third class of subframes comprise MBSFN subframes supporting PDSCH transmission and configured with 4 cell-specific antenna ports; a fourth class of subframes comprise subframes not supporting PDSCH transmission; a fifth class of subframes comprise non-MBSFN frames configured with positioning reference signals excluding the subframe 6 of the frame structure type 2; and a sixth class of subframes comprise subframes of all other cases.

4. The method according to claim 1, wherein, in the mode two, a number M of the RRC signalings of each user equipment is equal to a number of the subframe types designated by all component carriers which can be cross-carrier scheduled for the user equipment, and the M RRC signalings are ranked in an order of predefined subframe types.

5. The method according to claim 1, wherein, in the mode three, a number P of the RRC signalings of each user equipment is determined by a number Q of the subframe types designated by each component carrier which can be cross-carrier scheduled for the user equipment and a total number R of the component carriers which can be cross-carrier scheduled for the user equipment, i.e., $P=Q \times R$; and a rule for ranking the P RRC signalings is as follows: Q RRC signalings in each component carrier are ranked in an order of predefined subframe types, and Q RRC signalings corresponding to each of the R component carriers are ranked in cascade in an order of sizes of carrier indicators (CI) or frequencies of the component carriers which can be cross-carrier scheduled for the user equipment.

6. The method according to claim 1, wherein, an overhead of the one RRC signaling is 1 bit or 2 bits.

7. The method according to claim 6, wherein, the mode one or mode four further comprises:

according to a preset second subframe type classifying strategy, the RRC signaling and the subframe type of the component carrier corresponding to the RRC signaling jointly determine the CFI value of the component carrier, wherein, the subframe types in the second subframe type classifying strategy totally comprise the following six classes: a first class of subframes comprise a subframe 1 and a subframe 6 of a frame structure type 2; a second class of subframes comprise Multicast Broadcast Single Frequency Network (MBSFN) subframes supporting PDSCH transmission and configured with 1 or 2 cell-specific antenna ports; a third class of subframes comprise MBSFN subframes supporting PDSCH transmission and configured with 4 cell-specific antenna ports; a fourth class of subframes comprise subframes not supporting PDSCH transmission; a fifth class of subframes comprise non-MBSFN frames configured with positioning reference signals excluding the subframe 6 of the frame structure type 2; and a sixth class of subframes comprise subframes of all other cases.

8. The method according to claim 1, wherein, the mode one or mode four further comprises:

according to a preset second subframe type classifying strategy, the RRC signaling and the subframe type of the component carrier corresponding to the RRC signaling jointly determine the CFI value of the component carrier, wherein, the subframe types in the second subframe type classifying strategy totally comprise the following six classes: a first class of subframes comprise a subframe 1 and a subframe 6 of a frame structure type 2; a second class of subframes comprise Multicast Broadcast Single Frequency Network (MBSFN) subframes supporting PDSCH transmission and configured with 1 or 2 cell-specific antenna ports; a third class of subframes comprise MBSFN subframes supporting PDSCH transmission and configured with 4 cell-specific antenna ports; a fourth class of subframes comprise subframes not supporting PDSCH transmission; a fifth class of subframes comprise non-MBSFN frames configured with positioning reference signals excluding the subframe 6 of the frame structure type 2; and a sixth class of subframes comprise subframes of all other cases.

9. The method according to claim 8, wherein, in the mode one or mode four, the overhead of the one RRC signaling is 1 bit, when bandwidth of the component carriers which can be cross-carrier scheduled is more than 10 physical resource blocks, one of two states of the RRC signaling of 1 bit corresponds to one of two values in the following value combinations one by one according to the subframe types of the component carriers corresponding to the RRC signaling:

CFI values of the first class of subframes are (1, 2);
CFI values of the second class of subframes are (1, 2);
CFI values of the third class of subframes are (2, 2);
CFI values of the fourth class of subframes are (0, 0);
CFI values of the fifth class of subframes are (1, 2), (2, 3) or (1, 3);
CFI values of the sixth class of subframes are (1, 2), (2, 3) or (1, 3);
wherein, a form of "(A, B)" represents one kind of value combination of the CFI, and $A \leq B$;

when the bandwidth of the component carriers which can be cross-carrier scheduled is less than or equal to 10 physical resource blocks, one of two states of the RRC signaling of 1 bit corresponds to one of two values in the following value combinations one by one according to the subframe types of the component carriers corresponding to the RRC signaling:

the CFI values of the first class of subframes are (2, 2);
the CFI values of the second class of subframes are (2, 2);
the CFI values of the third class of subframes are (2, 2);
the CFI values of the fourth class of subframes are (0, 0);
the CFI values of the fifth class of subframes are (2, 3);
the CFI values of the sixth class of subframes are (2, 3), (2, 4) or (3, 4);
wherein, a form of "(A, B)" represents one kind of value combination of the CFI, and $A \leq B$.

10. The method according to claim 8, wherein, in the mode one or mode four, the overhead of the one RRC signaling is 2 bits, when the bandwidth of the component carriers which can be cross-carrier scheduled is more than 10 physical resource blocks, one of four states of the RRC signaling of 2 bits corresponds to one of three values in the following value combinations one by one according to the subframe types of the component carriers corresponding to the RRC signaling:

CFI values of the first class of subframes are (1, 2, 2) or (1, 1, 2);
CFI values of the second class of subframes are (1, 2, 2) or (1, 1, 2);
CFI values of the third class of subframes are (2, 2, 2);
CFI values of the fourth class of subframes are (0, 0, 0);
CFI values of the fifth class of subframes are (1, 2, 3);
CFI values of the sixth class of subframes are (1, 2, 3);
wherein, a form of "(A, B, C)" represents one kind of value combination of the CFI, and $A \leq B \leq C$;

when the bandwidth of the component carriers which can be cross-carrier scheduled is less than or equal to 10 physical resource blocks, one of four states of the RRC signaling of 2 bits corresponds to one of three values in the following value combinations one by one according to the subframe types of the component carriers corresponding to the RRC signaling:

the CFI values of the first class of subframes are (2, 2, 2);
the CFI values of the second class of subframes are (2, 2, 2);
the CFI values of the third class of subframes are (2, 2, 2);
the CFI values of the fourth class of subframes are (0, 0, 0);
the CFI values of the fifth class of subframes are (2, 2, 3) or (2, 3, 3);
the CFI values of the sixth class of subframes are (2, 3, 4);
wherein, a form of "(A, B, C)" represents one kind of value combination of the CFI, and $A \leq B \leq C$.

11. The method according to claim 1, wherein, when the designated subframe types are divided into two types, there is one or two of the following two cases:

a first case:
the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling is not more than 10 physical resource blocks, the CFI value of the first type of subframes of the component carriers is fixedly 2;

a second case:
the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), (1, 3) or (2, 3), and when the bandwidth of the component carriers corresponding to the RRC signaling of the second type of subframes is not more than 10 physical resource blocks, one of two states of the 1 bit corresponds to one of two values of the CFI one by one, and the two values are (2, 3), (2, 4) or (3, 4); or the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the three values are (1, 2, 3), and when the bandwidth of the component carriers corresponding to the RRC signaling of the second type of subframes is not more than 10 physical resource blocks, three of four states of the 2 bits determinately correspond to three or two values of the CFI, and the three values are (2, 3, 4), and the two values are (2, 3), (2, 4) or (3, 4).

12. The method according to claim 1, wherein, when the designated subframe types are divided into three types according to the classifying mode one, there is one or two of the following two cases:

a first case:
the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2;
the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), and when the bandwidth of the component carriers corresponding to the RRC signaling of the second type of subframes is not more than 10 physical resource blocks, the CFI value of the second type of subframes of the component carriers is fixedly 2;

a second case:
the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3), (2, 4) or (3, 4); or
the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the three values are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values are (2, 3, 4), or three of four states of the 2 bits determinately correspond to two values of the CFI, and the two values are (2, 3), (2, 4) or (3, 4).

13. The method according to claim 1, wherein, when the designated subframe types are divided into three types according to the classifying mode two, there is one or more of the following three cases:

a first case:
the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2;

a second case:
the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the second type of subframes is not more than 10 physical resource blocks, one of two states of the 1 bit corresponds to one of two values of the CFI one by one, and the two values are (2, 3); or,
the overhead of the RRC signaling of the second type of subframes is 2 bits, and when the bandwidth of the component carriers corresponding to the RRC signaling of the second type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the second type of subframes is not more than 10 physical resource blocks, three of four states of the 2 bits determinately corresponds to one of the two values of the CFI, and the two values are (2, 3);

a third case:
the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3), (2, 4) or (3, 4); or,
the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the three values are (1, 2, 3), and when the bandwidth of the component carriers corresponding to the RRC signaling of the third type of subframes is not more than 10 physical resource blocks, one of four states of the 2 bits corresponds to one of three values of the CFI one by one, and the three values are (2, 3, 4).

14. The method according to claim 1, wherein, when the designated subframe types are divided into four types, there is one or more of the following three cases:

a first case:
the overhead of the RRC signaling of the first type of subframes is 1 bit, and when the bandwidth of the component carriers corresponding to the RRC signaling of the first type of subframes is more than 10 physical resource blocks, one of two states of the 1 bit corresponds to one of two values of the CFI one by one, and the two values are (1, 2), and when the bandwidth of the component carriers corresponding to the RRC signaling of the first type of subframes is not more than 10 physical resource blocks, the CFI value of the first type of subframes of the component carriers is fixedly 2;

the overhead of the RRC signaling of the second type of subframes is 1 bit, and when the bandwidth of the component carriers corresponding to the RRC signaling of the second type of subframes is more than 10 physical resource blocks, one of two states of the 1 bit corresponds to one of two values of the CFI one by one, and the two values are (1, 2), and when the bandwidth of the component carriers corresponding to the RRC signaling of the second type of subframes is not more than 10 physical resource blocks, the CFI value of the second type of subframes of the component carriers is fixedly 2;

a second case:
the overhead of the RRC signaling of the third type of subframes is 1 bit, and when the bandwidth of the component carriers corresponding to the RRC signaling of the third type of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the third type of subframes is not more than 10 physical resource blocks, one of two states of the 1 bit corresponds to one of two values of the CFI one by one, and the two values are (2, 3); or, the overhead of the RRC signaling of the third type of subframes is 2 bits, and when the bandwidth of the component carriers corresponding to the RRC signaling of the third type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the third type of subframes is not more than 10 physical resource blocks, three of four states of the 2 bits determinately corresponds to one of two values of the CFI, and the two values are (2, 3);

a third case:
the overhead of the RRC signaling of the fourth type of subframes is 1 bit, and when the bandwidth of the component carriers corresponding to the RRC signaling of the fourth of subframes is more than 10 physical resource blocks, one of two states of the 1 bit corresponds to one of two values of the CFI one by one, and the two values are (1, 2), (2, 3) or (1, 3), and when the bandwidth of the component carriers corresponding to the RRC signaling of the fourth type of subframes is not more than 10 physical resource blocks, one of two states of the 1 bit corresponds to one of two values of the CFI one by one, and the two values are (2, 3), (2, 4) or (3, 4); or, the overhead of the RRC signaling of the fourth type of subframes is 2 bits, and when the bandwidth of the component carriers corresponding to the RRC signaling of the fourth type of subframes is more than 10 physical resource blocks, one of four states of the 2 bits corresponds to one of three values of the CFI one by one, and the two values are (1, 2, 3), and when the bandwidth of the component carriers corresponding to the RRC signaling of the fourth type of subframes is not more than 10 physical resource blocks, one of four states of the 2 bits corresponds to one of three values of the CFI one by one, and the three values are (2, 3, 4).

15. The method according to claim 1, wherein, the CFI value configured by the RRC signaling indicates an initial OFDM symbol position of the PDSCH which is cross-carrier scheduled.

16. An apparatus for transmitting Control Format Indicator (CFI) values, which is applied to a Radio Resource Control (RRC), comprising a CFI value configuration module and a signaling transmitting module, wherein, the CFI value configuration module is configured to configure the CFI values for component carriers which can be cross-carrier scheduled for user equipment by one of the following modes:

mode one: configuring one RRC signaling for each component carrier which can be cross-carrier scheduled for the user equipment, to indicate a CFI value of each subframe of the component carrier which can be cross-carrier scheduled;

mode two: configuring one RRC signaling respectively for each of subframe types designated by all component carriers which can be cross-carrier scheduled for the user equipment according to a preset first subframe type classifying strategy, to indicate a CFI value of each of the subframe types designated by the component carriers which can be cross-carrier scheduled;

mode three: configuring one RRC signaling respectively for each of subframe types designated by each component carrier which can be cross-carrier scheduled for the user equipment according to a preset first subframe type classifying strategy, to indicate a CFI value of each of the subframe types designated by the component carrier which can be cross-carrier scheduled; and mode four: configuring one RRC signaling for each user equipment for which cross-carrier scheduling can be performed, to indicate the CFI values of all component carriers which can be cross-carrier scheduled for the user, wherein, the component carriers which can be cross-carrier scheduled do not include the present carrier; and the signaling transmitting module is configured to transmit the related signaling of the CFI value configured by the CFI value configuration module to a signaling receiving party;

wherein, in the mode two or mode three, the first subframe type classifying strategy is one of the following classifying strategies:

a first type classifying strategy: dividing the designated subframe types into two types, wherein, a first type of subframes comprise a subframe 1 and a subframe 6 of a frame structure type 2 and Multicast Broadcast Single Frequency Network (MBSFN) subframes supporting PDSCH transmission and configured with 1 or 2 cell-specific antenna ports, a second type of subframes comprise non-MBSFN frames configured with positioning reference signals excluding the subframe 6 of the frame structure type 2 and subframes of all other cases;

a second type classifying strategy: dividing the designated subframe types into three types according to the following classifying modes, wherein, classifying mode one: a first type of subframes comprise a subframe 1 and a subframe 6 of a frame structure type 2, a second type of subframes comprise MBSFN subframes supporting PDSCH transmission and configured with 1 or 2 cell-specific antenna ports, and a third type of subframes comprise non-MBSFN frames configured with positioning reference signals excluding the subframe 6 of the frame structure type 2 and subframes of all other cases;

classifying mode two: a first type of subframes comprise a subframe 1 and a subframe 6 of a frame structure type 2 and MBSFN subframes supporting PDSCH transmission and configured with 1 or 2 cell-specific antenna ports, a second type of subframes comprise non-MBSFN frames configured with positioning reference signals excluding the subframe 6 of the frame structure type 2, and a third type of subframes comprise subframes of all other cases; and the third type classifying strategy: dividing the designated subframe types into four types, wherein, a first type of subframes comprise a subframe 1 and a subframe 6 of a frame structure type 2, a second type of subframes comprise MBSFN subframes supporting PDSCH transmission and configured with 1 or 2 cell-specific antenna ports, and a third type of subframes comprise non-MBSFN frames configured with positioning reference signals excluding the subframe 6 of the frame structure type 2, and a fourth type of subframes comprise subframes of all other cases;

wherein, a CFI value of MBSFN subframes supporting PDSCH transmission and configured with four cell-specific antenna ports is fixedly 2; and a CFI value of subframes not supporting PDSCH transmission is fixedly 0;

the subframes of all other cases do not comprise: the subframe 1 and subframe 6 of the frame structure type 2, the MBSFN subframes supporting PDSCH transmission and configured with 1 or 2 cell-specific antenna ports, the non-MBSFN frames configured with positioning reference signals excluding the subframe 6 of the frame structure type 2, the MBSFN subframes supporting PDSCH transmission and configured with 4 cell-specific antenna ports, and the subframes not supporting PDSCH transmission.

* * * * *